(12) United States Patent
Ikezawa et al.

(10) Patent No.: US 6,236,453 B1
(45) Date of Patent: *May 22, 2001

(54) LENS METER

(75) Inventors: Yukio Ikezawa; Eiichi Yanagi; Yasufumi Fukuma; Takeyuki Kato, all of Tokyo (JP)

(73) Assignee: Kabushiki Kaisha Topcon, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/313,663

(22) Filed: May 18, 1999

Related U.S. Application Data

(62) Division of application No. 08/937,184, filed on Sep. 29, 1997, now Pat. No. 5,910,836.

(30) Foreign Application Priority Data

Sep. 30, 1996 (JP) .................................................. 8-259171
Sep. 30, 1996 (JP) .................................................. 8-259172

(51) Int. Cl.$^7$ ...................................................... G01B 9/00
(52) U.S. Cl. ........................................... 356/124; 356/127
(58) Field of Search .................................. 356/124, 125, 356/126, 127

(56) References Cited

U.S. PATENT DOCUMENTS

| | | | |
|---|---|---|---|
| 5,173,739 | * | 12/1992 | Kurachi et al. ....................... 356/124 |
| 5,521,700 | * | 5/1996 | Kajino et al. ........................ 356/124 |
| 5,896,194 | * | 4/1999 | Yanagi et al. ....................... 356/124 |
| 5,910,836 | * | 6/1999 | Ikezawa et al. ..................... 356/124 |

FOREIGN PATENT DOCUMENTS

| | | | |
|---|---|---|---|
| 0208736 | * | 8/1988 | (JP) .................................... 356/124 |
| 6194266 | * | 7/1994 | (JP) .................................... 356/124 |

* cited by examiner

*Primary Examiner*—Hoa Q. Pham
(74) *Attorney, Agent, or Firm*—Finnegan, Henderson, Farabow, Garrett and Dunner, L.L.P.

(57) ABSTRACT

A lens meter is provided which comprises a light source for generation of a measuring light beam and a pattern forming plate provided in an optical path of the measuring light beam. The pattern forming plate has a central pattern for measuring lens characteristics of a narrow area on an eyeglass lens and a plurality of peripheral patterns for measuring lens characteristics of a wide area on the eyeglass lens. The pattern forming plate can be switched between a normal measuring mode which receives the image of the central pattern based on the measuring light beam transmitted through the narrow area of the eyeglass lens and also measures the narrow area alone and displays the measured values and a wide-area measuring mode which receives a great number of images of the peripheral patterns based on the measuring light beam transmitted through the wide area of the eyeglass lens and also measures the wide area and performs mapping display.

9 Claims, 19 Drawing Sheets

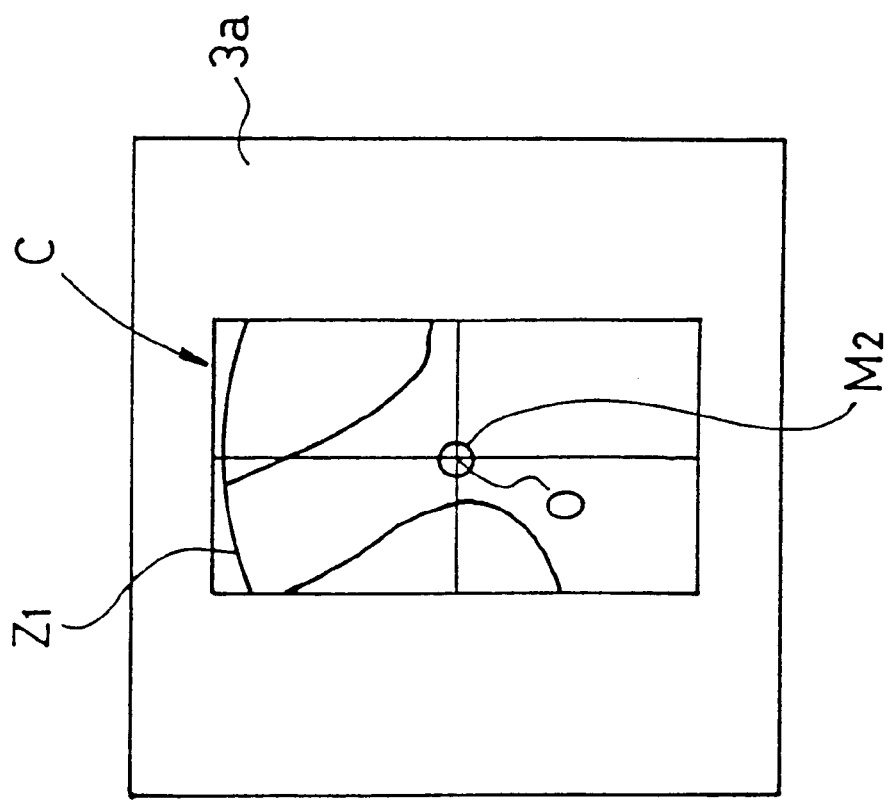
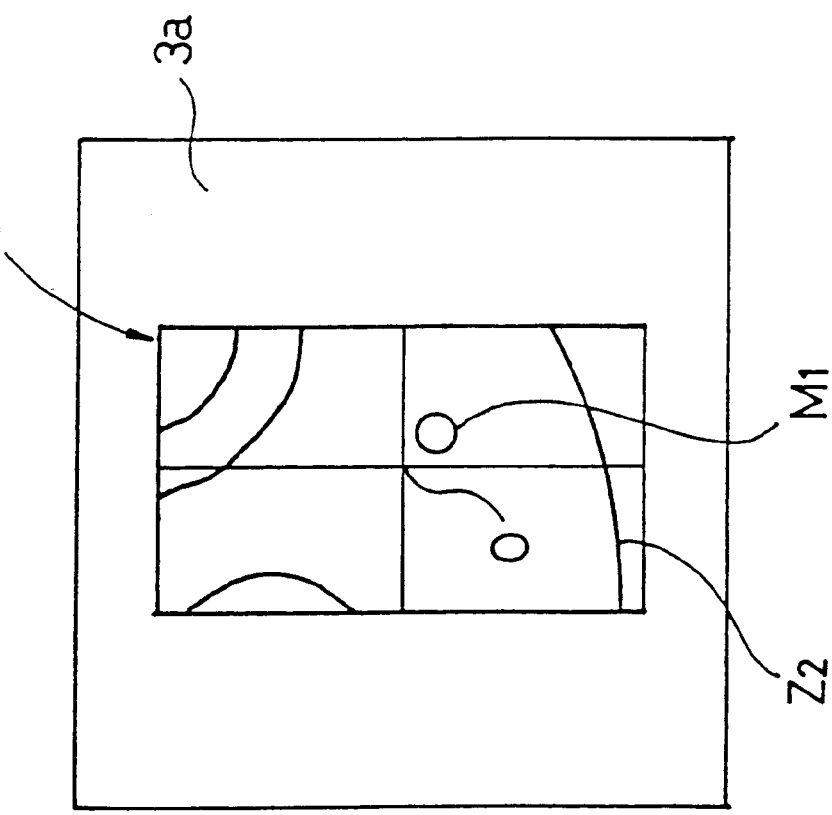

Prior Art

LENS METER

This is a division of application Ser. No. 08/937,184, filed Sep. 29, 1997, now U.S. Pat. No. 5,910,836 which is incorporated herein by reference.

BACKGROUND OF THE INVENTION

1. Field of the Invention

This invention relates to an improvement in a lens meter capable of displaying distribution mapping of the spherical degree, cylindrical degree, axial angle, and prism degree of a progressive power lens which is a subject lens to be tested (e.g., an eyeglass lens).

2. Description of the Related Art

In recent years, lens meters have been developed. The lens meter is equipped with a light source for generation of a measuring light beam. A progressive power lens (varifocal lens) is set in the optical path of the measuring light beam, and the images of a great number of patterns based on the measuring light beam transmitted through a wide area on the progressive power lens are received, thereby measuring the wide area and performing the image display (mapping display) of the distribution of a spherical degree S (see FIG. 26(a)), a cylindrical degree C (see FIG. 26(b)), an axial angle A (see FIG. 26(c)), and a prism degree Prs (see FIG. 26(d)).

In this kind of lens meter, a subject lens is arranged in an optical path so that the central portion of the subject lens is aligned with the center of measurement of the optical path, and a measuring light beam is transmitted through the wide area of the subject lens, thereby measuring the lens characteristics at each measuring point on the wide area of this subject lens. The lens meter is equipped with imaging/displaying means. The imaging/displaying means displays the lens characteristic information about at least a spherical degree S, a cylindrical degree (astigmatism degree) C, an axial angle A, and a prism degree Prs, based on the lens characteristics at each measuring point on the wide area of this eyeglass lens, and also performs mapping display with the center O of measurement on a screen corresponding to the center of measurement of the optical path as a reference.

When the measurement of an eyeglass lens is performed, there are cases where the lens characteristic values of the spherical degree S, cylindrical degree C, axial angle A, and prism degree Prs of the eyeglass lens are desired to be determined by measuring only a few narrow areas on the eyeglass lens. However, if the lens characteristic values of the spherical degree S, cylindrical degree C, axial angle A, and prism degree Prs of only a desired narrow area on an eyeglass lens are attempted to be obtained with an exclusive lens meter for mapping display, there are the problems that it will take time to obtain each lens characteristic value of the desired narrow area alone and it will be difficult to quickly obtain each lens characteristic value of the desired narrow area alone, because there is a need to compute a great number of measured values obtained by measuring a wide area on the eyeglass lens.

For example, in the case where an eyeglass lens is a lens having substantially the same power all over the surface thereof, such as a general spherical lens or a lens for astigmatism, each lens characteristic value of the spherical lens can be determined by measuring a portion of the spherical lens for astigmatism. In such a case, although it is desirable to measure the lens characteristic values of the spherical degree S, cylindrical degree C, axial angle A, and prism degree Prs of the eyeglass lens by measuring only a desired narrow area of the eyeglass lens, there is the problem that an exclusive lens meter for mapping display will take time for measurement.

Also, where an eyeglass lens as a subject lens is a progressive power lens, there are cases where the measurement is desired to be performed by judging a far point portion (distance portion) M1 and a near point portion (near portion) M2 (see FIG. 26(b)) from the entire data. In order to obtain accurate values of lens characteristics at the far point portion M1 and the near point portion M2 as the measuring points, the progressive power lens is demanded to be placed so that the rear surface of a point to be measured is perpendicular to the axis of a measuring light beam. Hence, in this kind of lens meter, in the state where the rear surface of a subject lens is attached closely to the lens receiver, the subject lens is moved with respect to the measuring light beam so that a desired measuring point on the subject lens is positioned at the center of measurement of the optical path, thereby perpendicularly projecting the measuring light beam onto the measuring point and performing the measurement.

In the aforementioned conventional lens meter capable of mapping display, the lens characteristics at each measuring point on the wide area of a subject lens are measured and image processing is performed based on the lens characteristics at each measuring point, thereby displaying image information on a screen. For this reason, the imaging process takes time, and the movement of a subject lens does not match with an image being displayed on a screen in real time. That is, after the subject lens has been moved, an image where the measuring point and the center of measurement are aligned with each other is displayed late on the screen. Hence, in correspondence with the movement of the subject lens, it is preferable to display in real time an image where the measuring point and the center of measurement are aligned with each other.

SUMMARY OF THE INVENTION

It is an object of the present invention to provide a lens meter which is capable of performing both the measurement of only a narrow area on an eyeglass lens and the measurement of the whole area.

Another object of the present invention is to provide a lens meter which is capable of displaying in real time an image where a measuring point and a center of measurement are caused to coincide with each other in correspondence with the movement of a subject lens.

In accordance with one aspect of the present invention, there is provided a lens meter comprising: a light source for generation of a measuring light beam; a normal mode in which lens characteristic values obtained by measuring a narrow area of an eyeglass lens are displayed; and a wide-area measuring mode in which a wide area of the eyeglass lens is measured and thereafter mapping display is performed.

Preferably, a pattern forming plate is provided in an optical path of the measuring light beam, and the pattern forming plate has a central pattern for measuring lens characteristics of the narrow area of the eyeglass lens and a plurality of peripheral patterns for measuring lens characteristics of the wide area of the eyeglass lens. The pattern forming plate can be switched between the normal mode which receives the image of the central pattern based on the measuring light beam transmitted through the narrow area of the eyeglass lens and also measures the narrow area alone and displays the measured values and the wide-area measuring mode which receives a great number of images of the peripheral patterns based on the measuring light beam transmitted through the wide area of the eyeglass lens and also measures the wide area and performs mapping display.

Preferably, the light source has a wavelength distribution characteristic and a plurality of wavelength characteristics. An image receiving path for receiving the image of a pattern based on the transmitted measuring light beam is divided into a first image receiving path which receives the image of the central pattern and a second image receiving path which receives the images of the peripheral patterns based on the transmitted measuring light beam. A beam splitter is provided at a position at which the image receiving path is divided into the first and second image receiving paths, and the beam splitter transmits a portion of the transmitted measuring light beam and reflects the remaining portion.

Furthermore, an optical magnifying system for magnifying the image of the central pattern is provided in the first image receiving path.

In a preferred form of the present invention, the light source is equipped with first and second light sources which generate measuring light beams different in wavelength from each other, the first light source being employed in the normal mode and the second light source being employed in the wide-area measuring mode. The central pattern has an optical wavelength which transmits at least the measuring light beam emitted from the first light source. The peripheral patterns have an optical wavelength which transmits only the measuring light beam emitted from the second light source.

In another preferred form of the present invention, a lens receiver for setting an eyeglass lens is provided in the optical path. The lens receiver has a support plate and a lens receiving cylinder which receives the eyeglass lens. An auxiliary lens receiving cylinder is set on the lens receiving cylinder in the normal mode.

In still another preferred form of the present invention, the auxiliary lens receiving cylinder comprises a lens receiving portion which transmits the transmitted measuring light beam contributing to formation of the image of the central pattern and a seat portion which shuts out the transmitted measuring light beam contributing to formation of the images of the peripheral patterns.

In still another preferred form of the present invention, a lens receiver for setting an eyeglass lens is provided in a light projection optical path, and the lens receiver has a support plate and a lens receiving cylinder which receives the eyeglass lens. The lens receiving cylinder transmits a transmitted measuring light beam contributing to formation of the image of the central pattern, and the support plate transmits a transmitted measuring light beam contributing to formation of the images of the peripheral patterns.

An auxiliary lens with a minus degree may also be provided in the lens receiving cylinder.

The height of the auxiliary lens receiving cylinder from the support plate preferably is higher than that of the lens receiving cylinder of the lens receiver from the support plate.

Either the auxiliary lens receiving cylinder or the lens receiver may also be equipped with change-over means which automatically switches a mode from the wide-area measuring mode to the normal mode when the auxiliary lens receiving cylinder is set on the lens receiver.

In a further preferred form of the present invention, a first lens receiving cylinder for the normal mode and a second lens receiving cylinder for the wide-area measuring mode are provided. The height from a support plate of the first lens receiving cylinder to the top of the first lens receiving cylinder is higher than that from a support plate of the second lens receiving cylinder to the top of the second lens receiving cylinder.

After setting the center of measurement of the eyeglass lens at a point regarded as a point of a distance portion of the eyeglass lens and measuring the wide area, mapping display may be performed by lens characteristics based on measurement of the wide area at the point regarded as the point of the distance portion, and after moving the center of measurement of the eyeglass lens to a point regarded as a point of a near portion of the eyeglass lens, based on mapping, and after measuring the wide area at the point regarded as the point of the near portion of the eyeglass lens, mapping display may be performed by lens characteristics based on the measurement at the point regarded as the point of the near portion.

In accordance with still another aspect of the present invention, there is provided a lens meter comprising: light emitting means, provided with a light source for generation of a measuring light beam, for emitting a measuring light beam to a wide area on a subject lens arranged in an optical path so that the center of measurement of the optical path is positioned at a central portion of the subject lens; measurement means for measuring lens characteristics at each measuring point on the wide area of the subject lens, based on the light emitting means; storage means for storing the lens characteristics obtained at each measuring point on the wide area of the subject lens; imaging/displaying means for imaging lens characteristic information about at least a spherical degree, an astigmatism degree, and an axial angle, based on the lens characteristics at each measuring point on the wide area of the subject lens, and also performing mapping display with the center of measurement of the optical path as a reference; and arithmetic means for computing a direction of movement and a quantity of movement of the subject lens, based on only a measuring point on the narrow area of the subject lens when the subject lens is moved with respect to the measuring light beam so that the periphery of the subject lens is positioned at the center of measurement of the optical path; and wherein, based on the result of the computation of the arithmetic means, the imaging/displaying means moves an image obtained based on the lens characteristics at each measuring point stored in the storage means so that a measuring point on the subject lens and the center of measurement of the optical path are aligned on a screen when the subject lens is moved with respect to the measuring light beam.

Preferably, the arithmetic means computes the direction of movement and the quantity of movement, based on a prism quantity.

In accordance with a further aspect of the present invention, there is provided a lens meter comprising: light emitting means, provided with a light source for generation of a measuring light beam, for emitting a measuring light beam to a wide area on a subject lens arranged in an optical path so that the center of measurement of the optical path is positioned at a central portion of the subject lens; measurement means for measuring lens characteristics at each measuring point on the wide area of the subject lens, based on the light emitting means; storage means for storing the lens characteristics obtained at each measuring point on the wide area of the subject lens; imaging/displaying means for imaging lens characteristic information about at least a spherical degree, an astigmatism degree, and an axial angle, based on the lens characteristics at each measuring point on the wide area of the subject lens, and also performing mapping display with the center of measurement of the optical path as a reference; and arithmetic means for computing a direction of movement and a quantity of movement of the subject lens, based on only a measuring point on the narrow area of the subject lens when the subject lens is moved with respect to the measuring light beam so that the periphery of the subject lens is positioned at the center of measurement of the optical path; and wherein the imaging/displaying means displays a measuring point on a screen, based on the arithmetic means in correspondence with movement of the subject lens.

In a further preferred form of the present invention, the arithmetic means computes the direction of movement and the quantity of movement, based on data comprising a spherical degree, a cylindrical degree, and an axial angle. A pattern forming plate is provided in the optical path and has a central pattern for measuring lens characteristics of the narrow area of the subject lens and a plurality of peripheral patterns for measuring lens characteristics of the wide area of the subject lens, and the pattern forming plate can be switched between a normal measuring mode which receives the image of the central pat tern based on the measuring light beam transmitted through the narrow area of the subject lens and also measures the narrow area alone and displays the measured values and a wide-area measuring mode which receives a great number of images of the peripheral patterns based on the measuring light beam transmitted through the wide area of the subject lens and also measures the wide area and performs mapping display.

In accordance with a further aspect of the present invention, there is provided a lens meter comprising: light emitting means, provided with a light source for generation of a measuring light beam, for emitting a measuring light beam to a wide area on a subject lens arranged in an optical path so that the center of measurement of the optical path is positioned at a central portion of the subject lens; measurement means for measuring lens characteristics at each measuring point on the wide area of the subject lens, based on the light emitting means; storage means for storing the lens characteristics obtained at each measuring point on the wide area of the subject lens; imaging/displaying means for imaging lens characteristic information about at least a spherical degree, an astigmatism degree, and an axial angle, based on the lens characteristics at each measuring point on the wide area of the subject lens, and also performing mapping display with the center of measurement of the optical path as a reference; and movement-quantity measurement means for measuring a quantity of movement when the subject lens is moved with respect to the measuring light beam so that the periphery of the subject lens is positioned at the center of measurement of the optical path; wherein the imaging/displaying means displays an image, obtained based on the lens characteristics at each measuring point stored in the storage means, so that the measuring point on the subject lens and the center of measurement of the optical path are aligned on a screen when the subject lens is moved with respect to the measuring light beam, by performing a coordinate conversion based on the result of the measurement of the movement-quantity measurement means.

BRIEF DESCRIPTION OF THE DRAWINGS

The present invention will be described in further detail with reference to the accompanying drawings wherein:

FIGS. 9($b$) and 9($c$) are modifications of the second embodiment of the lens meter according to the present invention;

FIG. 16($b$) is a view similar to FIG. 16($a$) showing a cylindrical degree distribution;

FIG. 16($c$) is a view similar to FIG. 16($a$) showing an axial angle distribution;

FIG. 16($d$) is a view similar to FIG. 16($a$) showing a prism degree distribution;

FIG. 16($e$) is a view similar to FIG. 16($a$) showing measured values along with the cylindrical degree distribution of the eyeglass lens;

FIG. 16($f$) is a view similar to FIG. 16($a$) showing the cylindrical degree distributions of an eyeglass lens for a left eye and an eyeglass lens for a right eye, one image having been inverted with respect to the other image;

FIG. 19(a) is a view showing a modification of the first through the third embodiments of the present invention, after setting the center of measurement of a framed eyeglass lens at the far point portion of the eyeglass lens and measuring a wide area on the eyeglass lens, mapping display having been performed by the lens characteristic values based on the measurement of the wide area at the far point portion of the eyeglass lens;

FIG. 19(b) is a view showing modification of the first through the third embodiments of the present invention, after setting the center of measurement of a framed eyeglass lens at the far point portion of the eyeglass lens and measuring a wide area on the eyeglass lens and after moving the center of measurement of the eyeglass lens to the near point portion of the eyeglass lens, mapping display having been performed by the lens characteristic values based on the measurement at the near point portion of the eyeglass lens;

DETAILED DESCRIPTION OF THE PREFERRED EMBODIMENTS

First Embodiment

Figure 1:
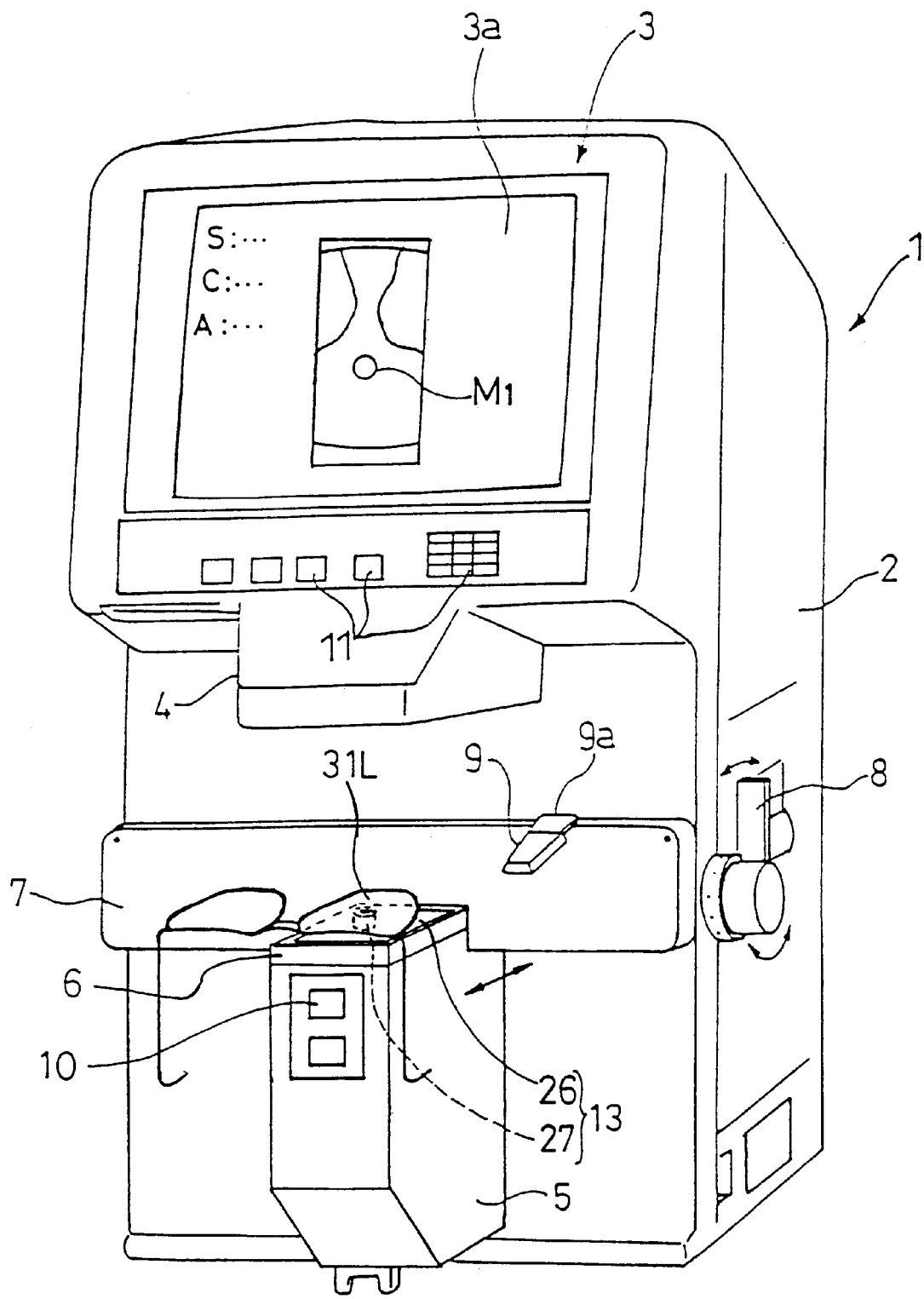
FIG. 1 is a schematic view of a lens meter according to the present invention.

Referring to FIG. 1, there is shown a lens meter 1 in accordance with a first embodiment of the present invention. The lens meter 1 is constituted by a main body 2, a monitor 3, such as a CRT and a liquid crystal display, provided on the upper portion of the main body 2 and having a display screen 3a, an upper optical-component housing portion 4 provided on the front side of the main body 2, and a lower optical-component housing portion 5 provided so as to be positioned under the upper optical-component housing portion 4. Furthermore, the lens meter 1 is constituted by a lens receiving table 6 provided on the upper end of the lower optical-component housing portion 5, a lens pad 7 interposed between the upper and lower housing portions 4 and 5 and held on the front surface of the main body 2 so as to be movable back and forth, and a control lever 8 held on the side of the main body 2 so as to be rotatable up and down. The back and forth movements of the lens pad 7 are adjusted by up and down rotations of the control lever 8.

On the upper end of the lens pad 7 a slider 9a is held so as to be freely movable right and left, and on this slider 9a a nose-pad support member 9 is held so as to be rotatable up and down. This nose-pad support member 9 is urged upward by a spring (not shown) and the upward rotation is regulated at a horizontal position. The lower optical-component housing 5 is provided with a switch 11 for mode switching and a measurement start switch 11.

Figure 2:
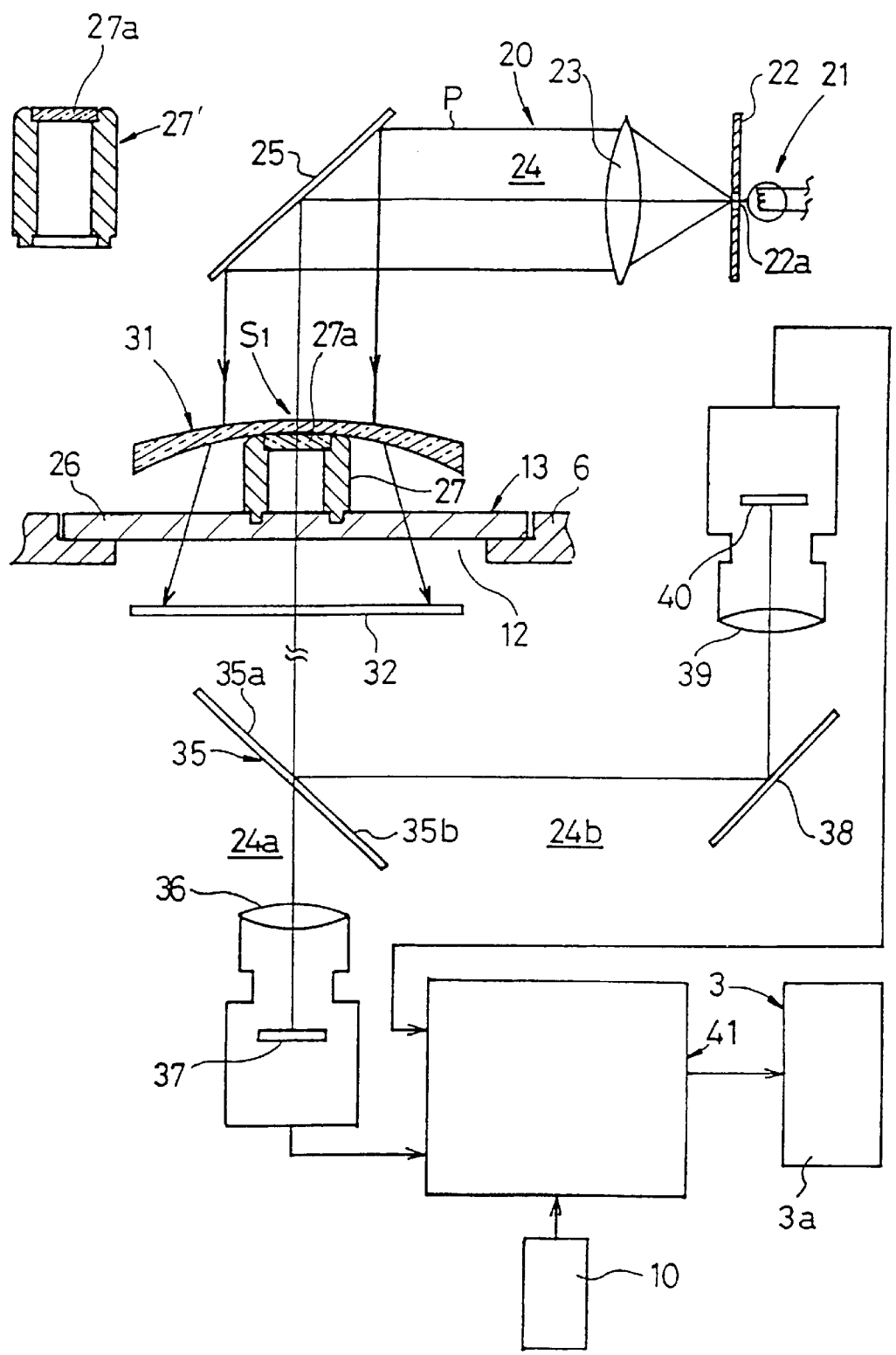
FIG. 2 is an optical diagram showing a first embodiment of the lens meter according to the present invention.

The lens receiving table 6 is formed with a stepped mounting hole 12, as shown in FIG. 2, and a lens receiver 13 is provided in this mounting hole 12. A circular unprocessed lens or an eyeglass lens framed in the eyeglass frame is set on the lens receiver 13.

An optical measuring system shown in FIG. 2 is provided interiorly of the main body 2. In the figure, reference numeral 20 denotes light emitting means, which has a light source 21 for generating a measuring light beam, a pinhole plate 22, and a collimator lens 23. The pinhole plate 22 is formed with a pinhole 22a. The light source 21 has a wavelength distribution characteristic and a plurality of wavelengths.

The pinhole plate 22 is disposed at the focal position of the collimator lens 23. The collimator lens 23 fulfills a role of converting a measuring light beam emitted from the light source 21 to a collimated light beam P. On the way of the optical path 24 of the collimated light beam P, a reflecting mirror 25 is provided above the lens receiving table 6.

Figure 3:
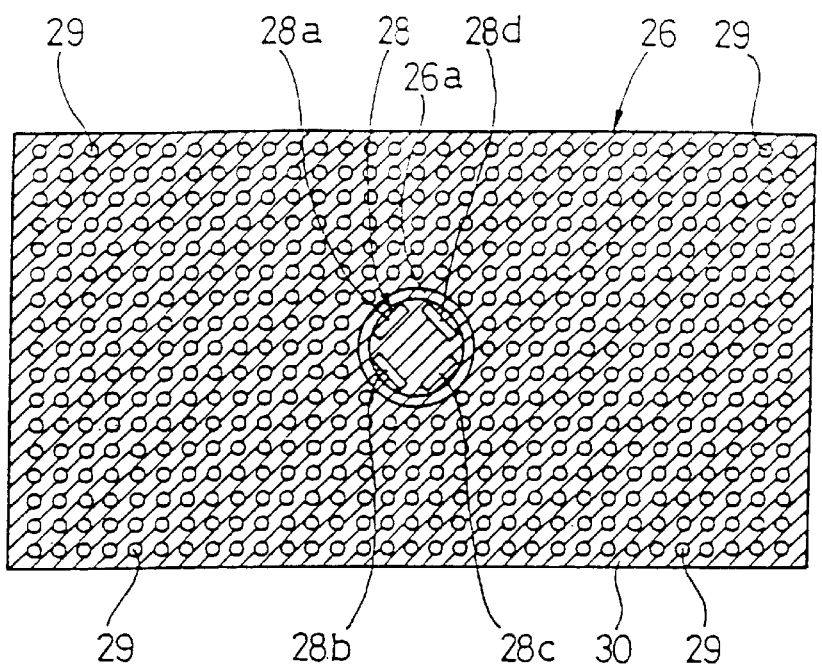
FIG. 3 is a plan view of the support plate shown in FIG. 1.

The lens receiver 13 which is placed on the lens receiving table 6 is constituted by a support plate 26 and a lens receiving cylinder 27. The support plate 26 is rectangular in shape as shown in FIG. 3 and is fastened to the lens receiving table 6 through the stepped mounting hole 12.

The lens receiving cylinder 27 is made of metal. The support plate 26 is formed with an annular lens-receiver mounting groove 26a at the central portion thereof. The lens receiving cylinder 27 is provided with a transparent cover glass 27a for dust protection.

The lens receiving cylinder 27 is detachably mounted in the support plate 26, and a lens receiving cylinder 27' (not shown) higher in height than the lens receiving cylinder 27 can also be mounted in the support plate 26.

The support plate 26 is formed with a central pattern 28 inside the annular groove 26a. This central pattern 28 is formed by four slit holes 28a through 28d. The central pattern 28 presents a square shape as a whole by these slit holes 28a through 28d. The end edges of the slit holes 28a through 28d are spaced from one another.

The support plate 26 is formed with regularly spaced peripheral patterns 29 outside the annular groove 26a. These peripheral patterns 29 consist of circular holes, and the central pattern 28 and the peripheral pattern 29 are different in pattern shape. The remaining portion of the support plate 26 constitutes a light shielding portion 30, and the support plate 26 has a function as a pattern forming plate. The light shielding portion 30 is shown by oblique lines in FIG. 3.

In this embodiment, it is assumed than an unprocessed lens with negative power has been set as an eyeglass lens 31 on the lens receiver 13. On the optical path 24 a screen 32 is provided at a position of predetermined distance from the eyeglass lens 31. This screen 32 consists, for example, of a diffusing plate.

Figure 4:
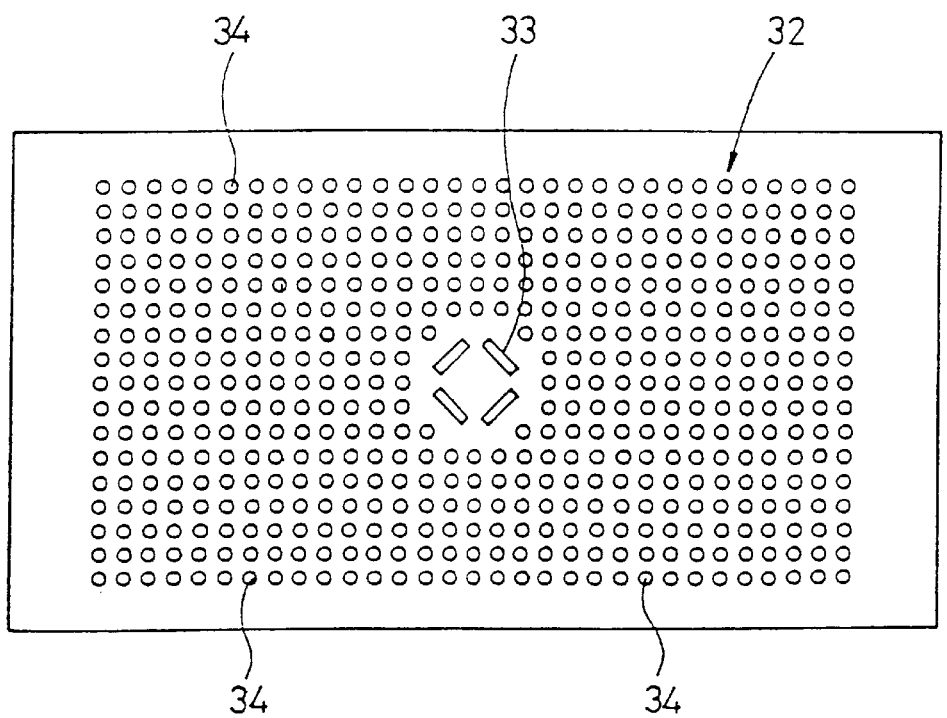
FIG. 4 is a plan view showing the images of patterns projected on a screen when an eyeglass lens is not set in an optical path.

When the eyeglass lens 31 has not been set in the optical path 24, the measuring light beam, as it is the collimated light beam P, is guided to the support plate 26 and transmitted through the patterns 28 and 29 on this support plate 26. Consequently, based on the transmitted measuring light beam, patterns corresponding to the support plate 26 are projected onto the screen 32, as shown in FIG. 4.

In the figure, 33 denotes a central pattern image on the screen 32 corresponding to the central pattern 28, and 34 denotes a peripheral pattern image on the screen 32 corresponding to the peripheral pattern 29.

Figure 5:
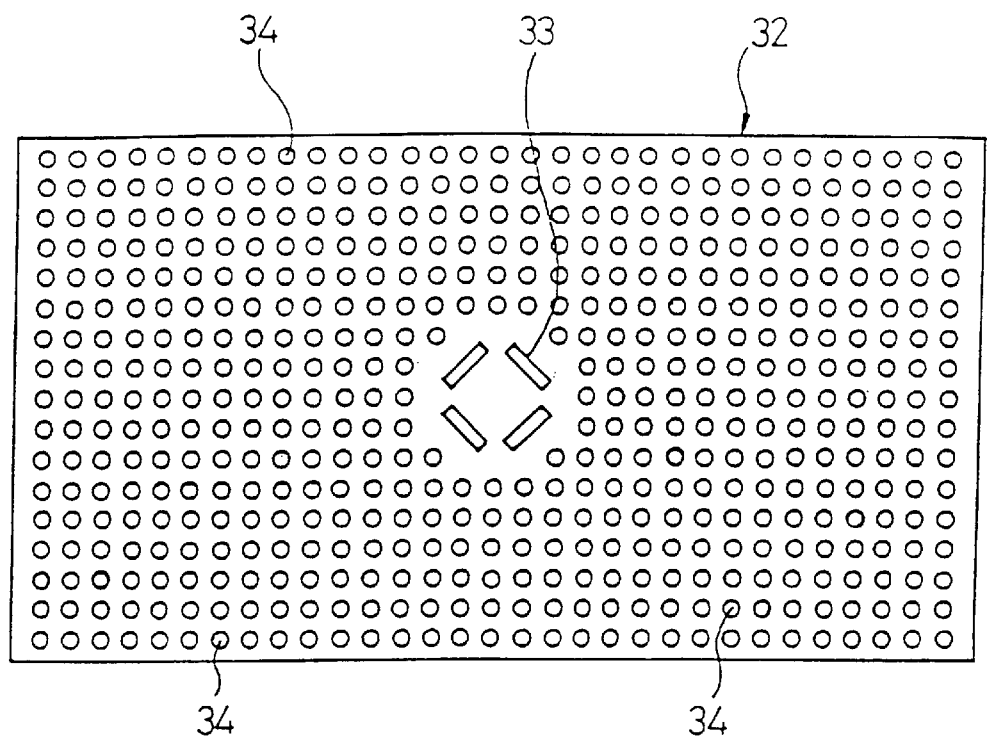
FIG. 5 is a plan view showing an example of the images of patterns projected on a screen when an eyeglass lens with negative power is set in the optical path.
Figure 6:
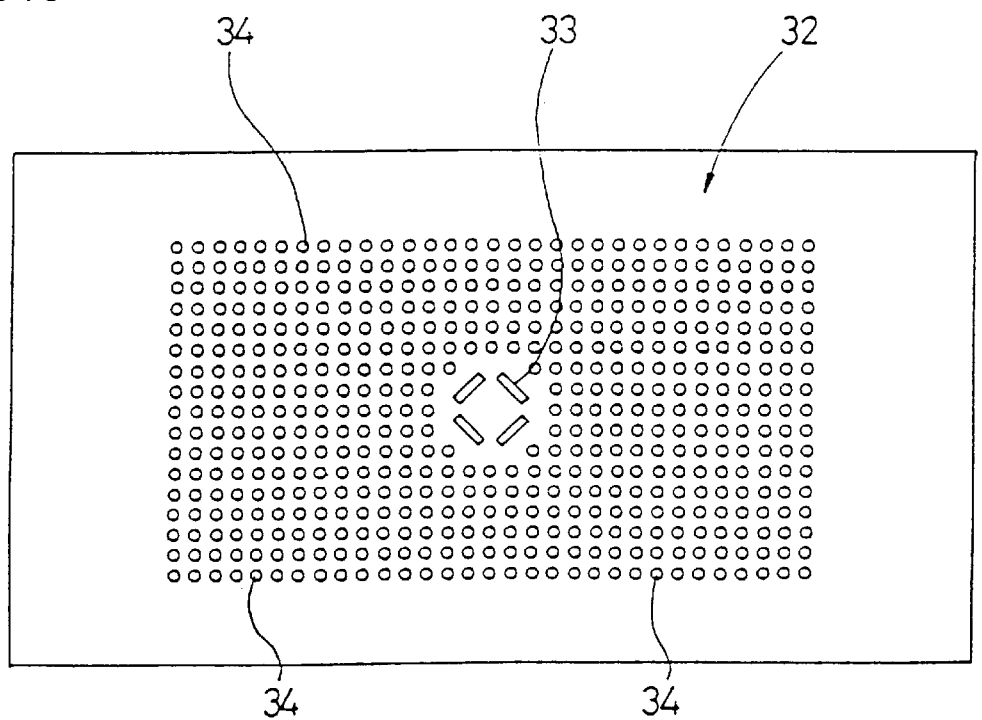
FIG. 6 is a plan view showing an example of the images of patterns projected on a screen when a eyeglass lens with positive power is set in the optical path.

If the eyeglass lens 31 is set in the optical path 24, then the wide area S1 on that eyeglass lens 31 will be irradiated by the collimated light beam P. The collimated light beam P is subjected to deformation by the negative power of the eyeglass lens 1 and is diffused. Consequently, patterns with widened spacings are projected onto the screen 32, as shown in FIG. 5. If an eyeglass lens with positive power (not shown) is set in the optical path 24, the collimated light beam P will be subjected to deformation by the positive power of the eyeglass lens and will be converged. As a consequence, patterns with narrowed spacings are projected onto the screen 32, as shown in FIG. 6.

On the optical path 24 there is provided a beam splitter 35 behind the screen 32. This beam splitter 35 has a half mirror surface 35a at the central portion thereof and a total reflecting mirror surface 35b around the half mirror surface 35a. Therefore, the optical path 24 is divided by the beam splitter 35 into a first image receiving path 24a which receives a central pattern image 33 and a second image receiving path 24b which receives peripheral pattern images 34.

A first image forming lens 36 and a first image pick-up device 37 are provided in the first image receiving path 24a. The first image pick-up device 37 is provided at a position which is conjugate with the screen 32 with respect to the first image forming lens 36. A total reflecting mirror 38, a second image forming lens 39, and a second image pick-up device 40 are provided in the second image receiving path 24b. The second image pick-up device 40 is provided at a position which is conjugate with the screen 32 with respect to the second image forming lens 39.

Figure 7:
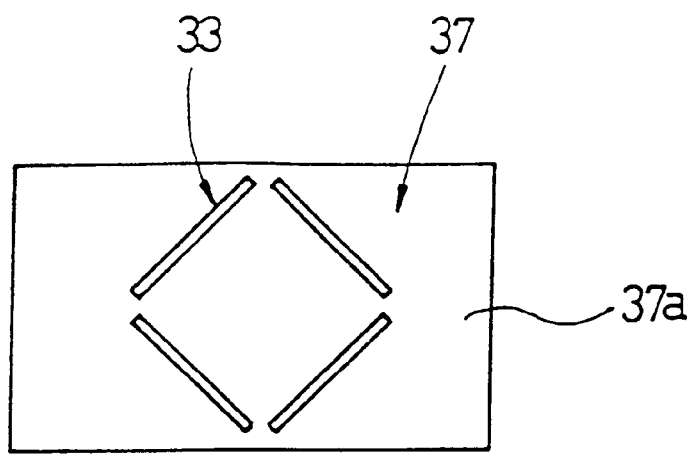
FIG. 7 is a plan view showing the state where only the image of a central pattern has been formed on an enlarged scale on the image pick-up device shown in FIG. 2.
Figure 8:
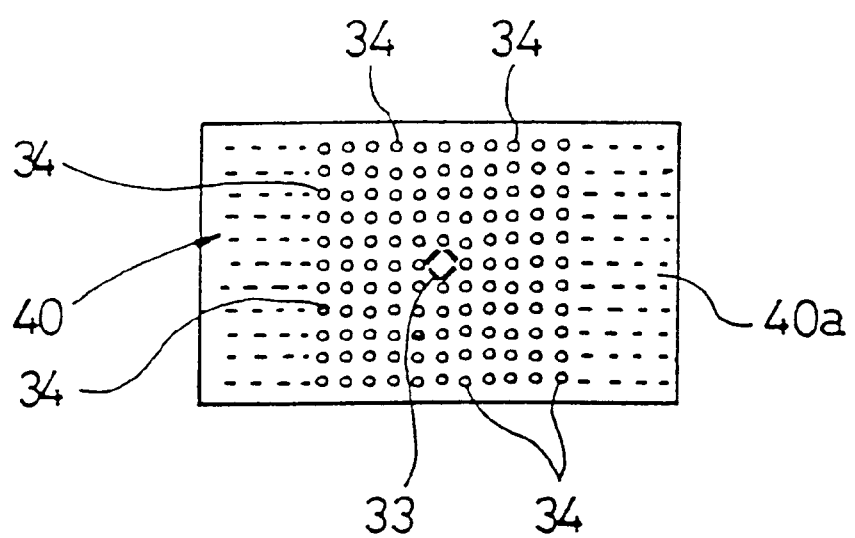
FIG. 8 is a plan view showing the state where a plurality of images of peripheral patterns have been formed on the image pick-up device shown in FIG. 2.

Only the central pattern image 33 on the screen 32 is formed on the first image pick-up device 37 through the half mirror surface 35a of the beam splitter 35, while the peripheral pattern images 34 are formed on the second image forming device 40, based on the reflection of the total reflecting mirror surface 35b. Since the central pattern image 33 alone is formed on the first image pick-up device 37, the central pattern image 33 can be projected on an enlarged scale onto the image pick-up surface 37a of the image pick-up device 37 as shown in FIG. 7, if an optical magnifying system is employed as the image forming lens 36. Therefore, an enhancement in the analysis precision of the central pattern image 33 is achievable. On the other hand, all of the peripheral pattern images 34 are projected on the image pick-up surface 40a of the second image pick-up device 40, as shown in FIG. 8.

The first image pick-up device 37 and the second image pick-up device 40 are connected to a processing circuit 41. This processing circuit 41 has a function of performing both a normal measuring mode which receives the central pattern image 33 based on the measuring light beam transmitted through the narrow area of the eyeglass lens 31 and also measures the narrow area alone and displays the measured values and a wide-area measuring mode which receives a great number of peripheral pattern images 34 based on the measuring light beam transmitted through the wide area of the eyeglass lens 31 and also measures the wide area and performs mapping display. The processing circuit 41 is connected to a change-over switch 10. The change-over switch 10 has a function of switching the processing circuit 41 between the normal measuring mode which receives the central pattern image 33 based on the measuring light beam transmitted through the narrow area of the eyeglass lens 31 and also measures the narrow area alone and displays the measured values and the wide-area measuring mode which receives a great number of peripheral pattern images 34 based on the measuring light beam transmitted through the wide area of the eyeglass lens 31 and also measures the wide area and performs mapping display.

For example, if the change-over switch 10 is turned on, the processing circuit 41 will be caused to be in the normal measuring mode which receives the central pattern image 33 based on the measuring light beam transmitted through the narrow area of the eyeglass lens 31 and also measures the narrow area alone and displays the measured values. Based on the central pattern image 33 alone, lens characteristics, such as a spherical degree, a cylindrical degree, an axial angle, and a prism degree, are computed, and the result is displayed on the display screen 3a of the monitor 3 as numerical values. In this normal measuring mode, since lens characteristics are measured and computed based on only the central pattern image 33, the processing speed is high. Also, for example, if the change-over switch 10 is turned off, the processing circuit 41 will be caused to be in the wide-area measuring mode which receives a great number of peripheral pattern images 34 based on the measuring light beam transmitted through the wide area of the eyeglass lens 31 and also measures the wide area and performs mapping display. The degree distribution based on the lens characteristics at each position on the wide area is computed and the spherical degree, the cylindrical degree, the axial angle, and the prism degree are displayed on the display screen 3a of the monitor 3.

When performing measurements in the wide-area measuring mode, the data of the central portion of the eyeglass lens 31 can also be measured by employing the central pattern image 33.

In the normal measuring mode, since only a desired narrow area on the eyeglass lens 31 is measured, there are cases where the eyeglass lens 31 is moved in the state of placement on the lens receiving cylinder 27. For this reason, when it is moved in the state of placement on the lens receiving cylinder 27, in the case where the edge of the eyeglass lens 31 abuts the support plate 26 or the lens receiving table 6 and therefore it is difficult to perform a measurement, it will be sufficient if the lens receiving cylinder 27 is removed from the support plate 26, then it is exchanged for the lens receiving cylinder 27' and measurements are performed.

In the first embodiment of this invention, while a mirror has been employed as the beam splitter 35, a dichroic prism may also be employed to have a similar function.

Second Embodiment

Figure 9:
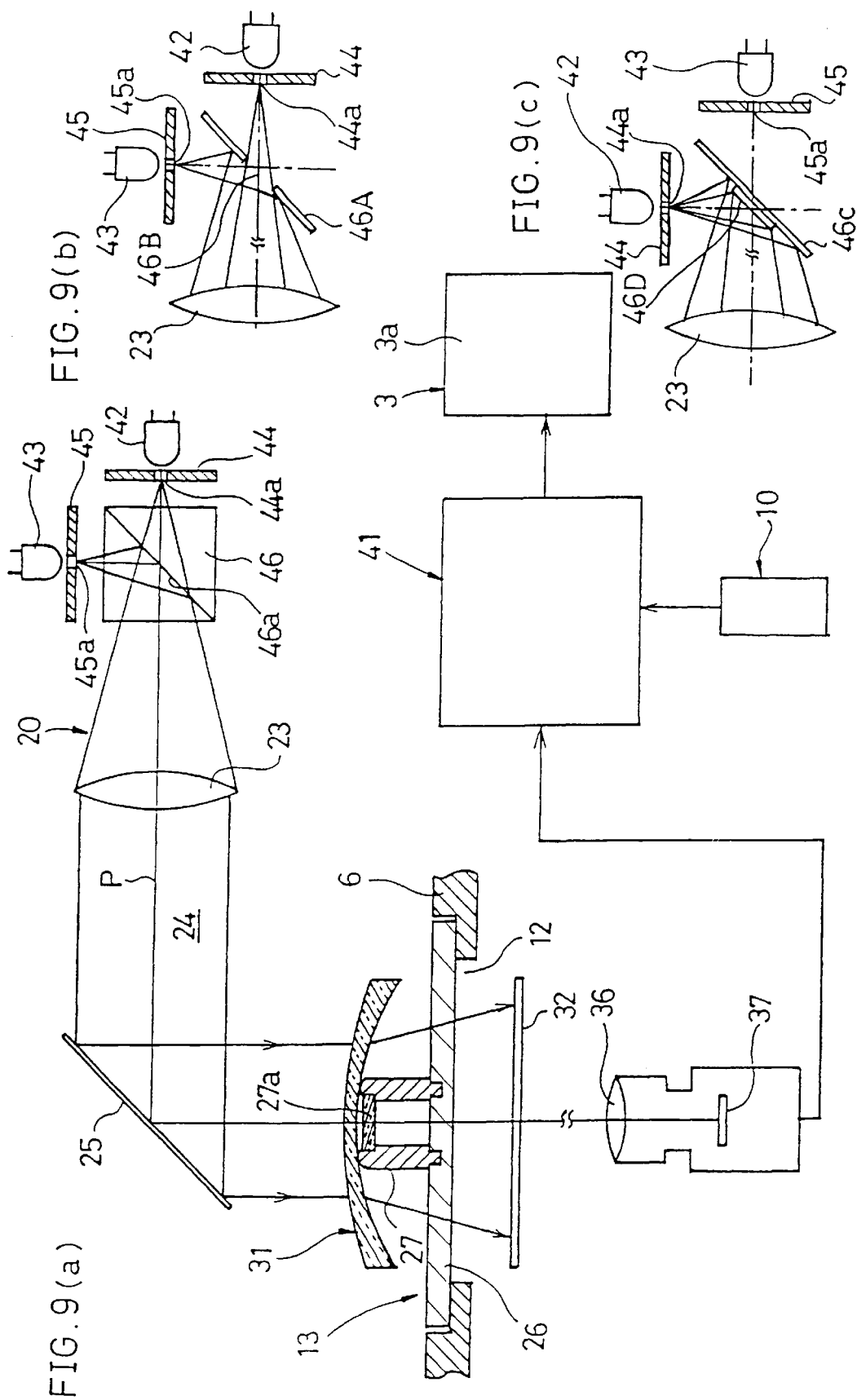
FIG. 9($a$) is an optical diagram showing a second embodiment of the lens meter according to the present invention.

In FIG. 9, reference numerals 42 and 43 denote light-emitting diodes (LEDs) as light sources, 44 and 45 pinhole plates 44*a* and 45*b* pinholes, and 46 a beam splitter. In this embodiment, it is assumed that the LED 42 generates a measuring light beam of wavelength 550 nm and the LED 43 generates a measuring light beam of wavelength 660 nm. Thus, the wavelengths of the measuring light beams of the two LEDs differ from each other. The beam splitter 46 has a dichroic mirror surface 46*a*, which transmits a measuring light beam of wavelength 550 nm and reflects a measuring light beam of wavelength 660 nm. The pinhole plates 44 and 45 are arranged at the focal positions of the collimator lens 23. Each measuring light beam, as with that described in the first embodiment of the present invention, is guided to the collimator lens 23 and converted to a collimated light beam P.

Figure 10:
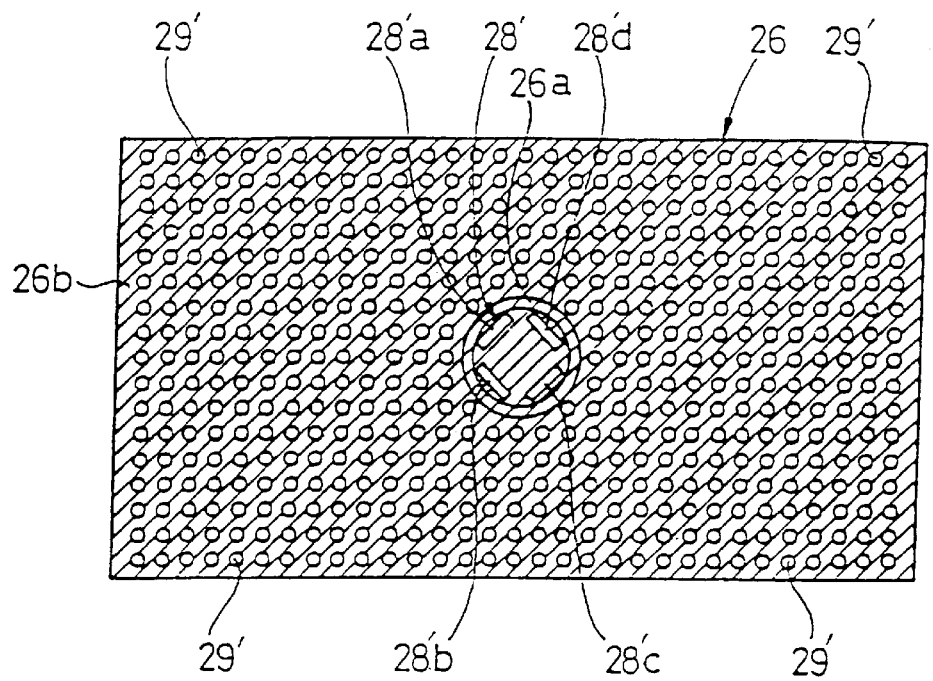
FIG. 10 is a plan view of the support plate shown in FIG. 9.
Figure 11:
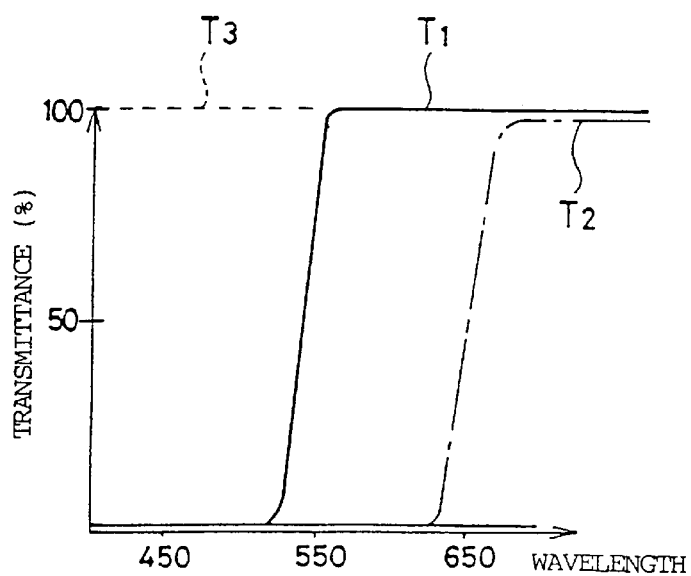
FIG. 11 is a transmittance curve diagram showing the transmittance characteristic of each pattern formed in the pattern forming plate shown in FIG. 10.
Figure 12:
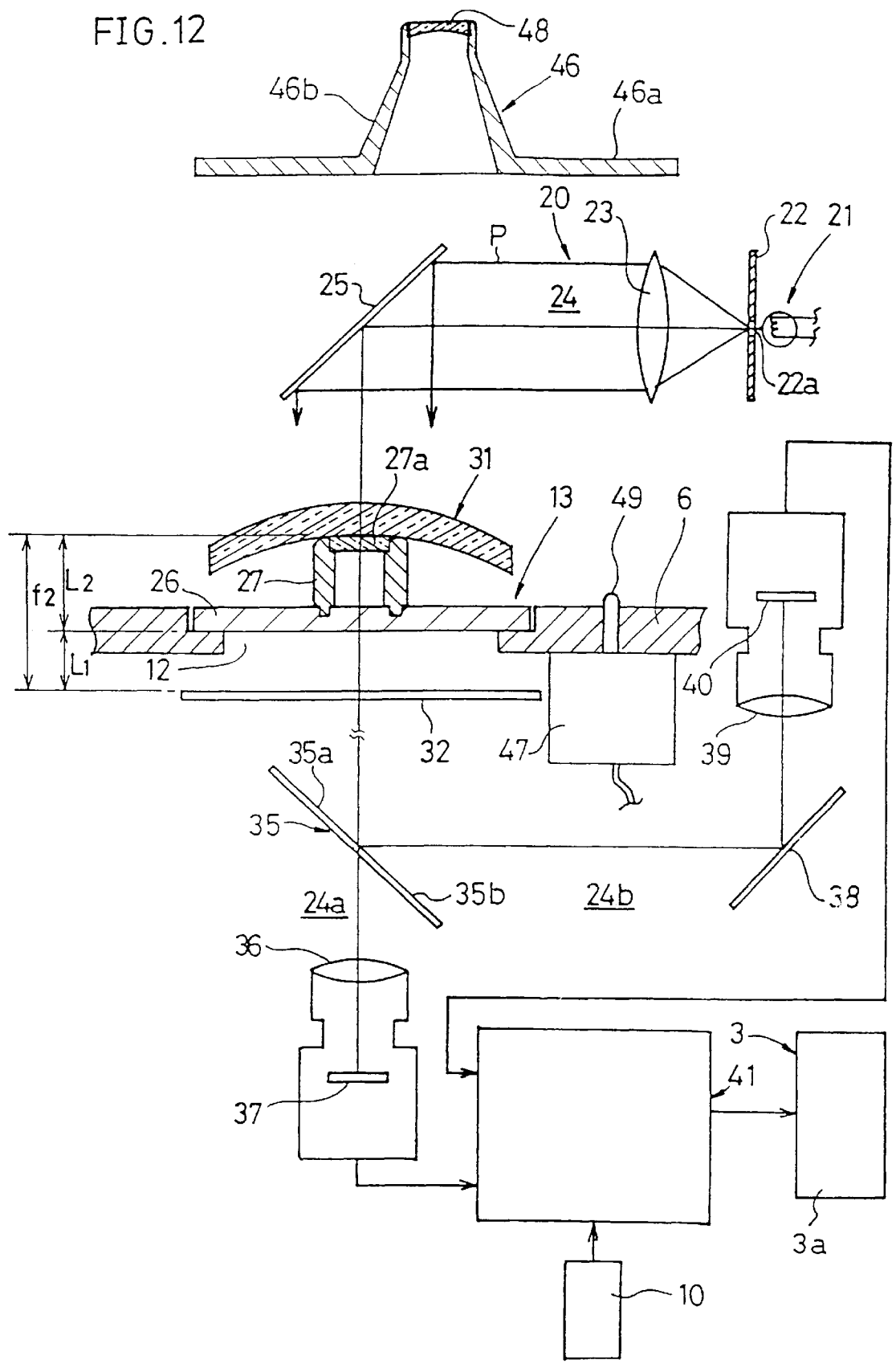
FIG. 12 is an optical diagram showing a third embodiment of the lens meter according to the present invention.

In the second embodiment of this invention, the support plate 26, as shown in FIG. 10, is constituted by a central pattern 28' which transmits a measuring light beam of wavelength 550 nm or more (see a transmittance curve indicated by reference character T1 in FIG. 11), peripheral patterns 29' which transmit a measuring light beam of wavelength 660 nm or more (see a transmittance curve indicated by reference character T2 in FIG. 11), and a light shielding portion 26*b*.

In the second embodiment of this invention, there is provided only a single image pick-up device, which is indicated by reference numeral 37. In this embodiment, for example, if a change-over switch 10 is turned on, a processing circuit 41 will be caused to be in a normal measuring mode. In this mode, the LED 42 is driven and the central pattern 28' alone is projected on a screen 32. Then, the image of the central pattern 28' alone is received on the image pick-up device 37, based on the measuring light beam transmitted through the narrow area of an eyeglass lens 31. Also, if the change-over switch 10 is turned off, the processing circuit 41 will be caused to be in a wide-area measuring mode. In this mode, the LED 43 is driven and the peripheral patterns 29' are projected on the screen 32. Then, the images of the peripheral patterns 29' are received on the image pick-up device 37, based on the measuring light beam transmitted through the wide area of the eyeglass lens 31.

It is noted that the central pattern 28' may also have a transmittance characteristic of 100% over the entire wavelength range, as shown by reference character T3 in FIG. 11.

FIG. 9(*b*) shows a modification of the light source. If the LEDs 42, 43 are different in wavelength form each other, a perforated mirror 46A, instead of the beam splitter 46, may be provided so that a middle part of the light beam of the LED 42 is guided to the collimator lens 23 through a perforated portion 46B. FIG. 9(*c*) also shows a modification of the light source. If the LEDs 42, 43 are the same in wavelength as each other, a reflecting mirror 46*c*, instead of the beam splitter 46, may be provided so that the middle part of the light beam of the LED 42 is reflected by a reflection surface 46D.

Third Embodiment

FIGS. 12 through 15 are explanatory diagrams of a third embodiment according to the present invention. In the figures, for the same parts as the first embodiment of the present invention, the detailed description is omitted by applying the same reference numerals, and a description will be made only of different parts.

This embodiment is constructed so that an auxiliary lens receiving cylinder 46 is set on a lens receiving cylinder 27. The auxiliary lens receiving cylinder 46 consists of a seat portion 46*a* and a cylindrical lens receiving portion 46*b*. A lens receiving table 6 is provided with a microswitch 47. The cylindrical lens receiving portion 46*b* is provided with an auxiliary lens 48. The microswitch 47 is provided with a connector (not shown), and the microswitch 47 is connected to a processing circuit 41 through the connector. Reference numeral 49 is the actuator rod of the microswitch 47. This microswitch 47 has a function of automatically switching a mode between a normal measuring mode and a wide-area measuring mode, if the auxiliary lens receiving cylinder 46 is placed on the lens receiving table 6.

The reasons why there is provided the auxiliary lens 48 are as follows:

In the case where the eyeglass lens 15 is a progressive power lens, the range of measurement (dynamic range) has been demanded to be +15 diopters to −15 diopters. In the case of available lens meters for measuring only a narrow area on the eyeglass lens 31, the range of measurement (dynamic range) has been demanded to be +25 diopters to −25 diopters.

Figure 13:
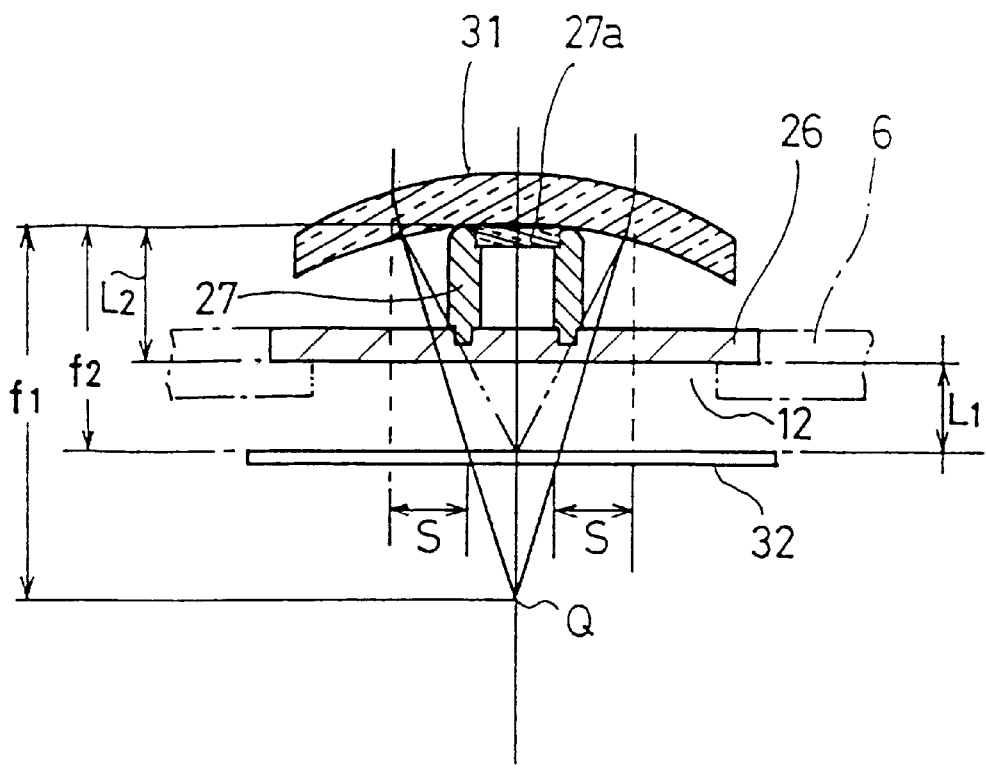
FIG. 13 is an explanatory diagram for explaining the positional relationship between the support plate and the screen shown in FIG. 12.
Figure 14:
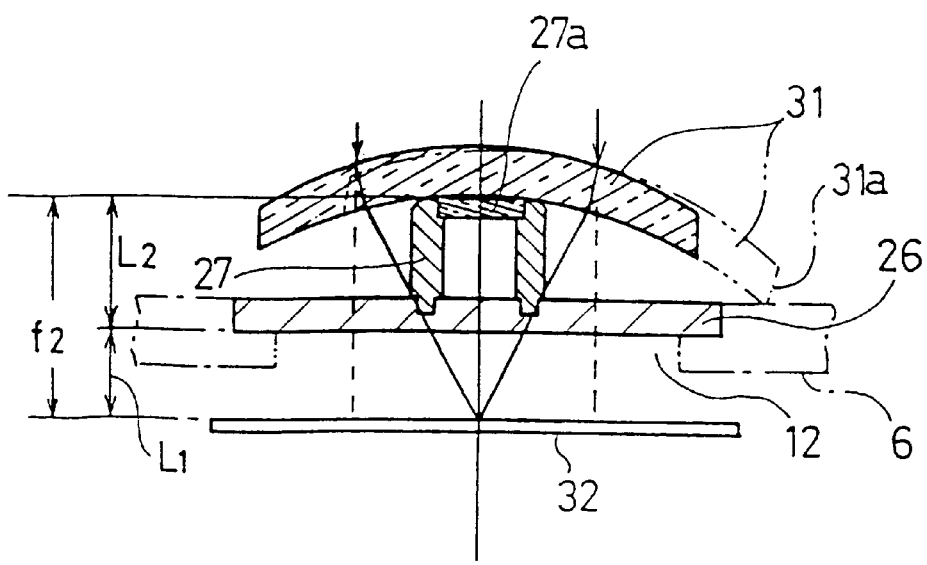
FIG. 14 is an explanatory diagram for explaining the positional relationship between the support plate and the screen shown in FIG. 12, the edge of an eyeglass lens having abutted a lens receiver when the eyeglass lens is moved.

Therefore, in the case where the eyeglass lens 31 is a progressive power lens, as shown in FIG. 13, the back focus distance f1 is a minimum of about 66.67 mm. On the other hand, in the case of available lens meters, the back focus distance f2 of the eyeglass lens 31 is a minimum of about 40 mm. Now, the distance from the support plate 26 to the screen 32 is taken to be L1 and the height from the support plate 26 to the top of the lens receiving cylinder 27 is taken to be L2 (f2=L2+L1). In the screen 32 is moved from a distance of L1 toward the support plate 26, the displacement quantity S of a measuring light beam on the screen 32 will be reduced. Also, conversely, if the screen 32 is moved away from the support plate 26 located at L1 and is moved toward the point Q of the back focus distance f1, measuring light beams will cross each other and therefore measurements cannot be performed, when the eyeglass lens 31 with a back focus of 40 mm has positive power and is measured in a normal measuring mode.

Hence, the height L2 from the support plate 26 to the top of the lens receiving cylinder 27 is set to about 10 mm and the distance L1 from the support plate 26 to the screen 32 is set to 30 mm. In this way, if the distance L1 from the support plate 26 to the screen 32 is set, measurement sensitivity will be satisfactory, and furthermore, even in the case of both a normal measuring mode and a wide-area measuring mode, measurements can be taken over the entire range of measurement without hindrance.

However, in a normal measuring mode, since only a desired narrow area on the eyeglass lens 31 is measured, sometimes the eyeglass lens 31 is moved in the state of placement on the lens receiving cylinder 27, as previously described. In such a case, when the eyeglass lens 31 is moved in the state of placement on this lens receiving cylinder 27, the edge 31*a* of the eyeglass lens 31 abuts the lens receiving table 6 or the support plate 26 as shown by a one-dotted chain line in FIG. 14 and there are cases where the measurement of a desired narrow area can not be performed.

Figure 15:
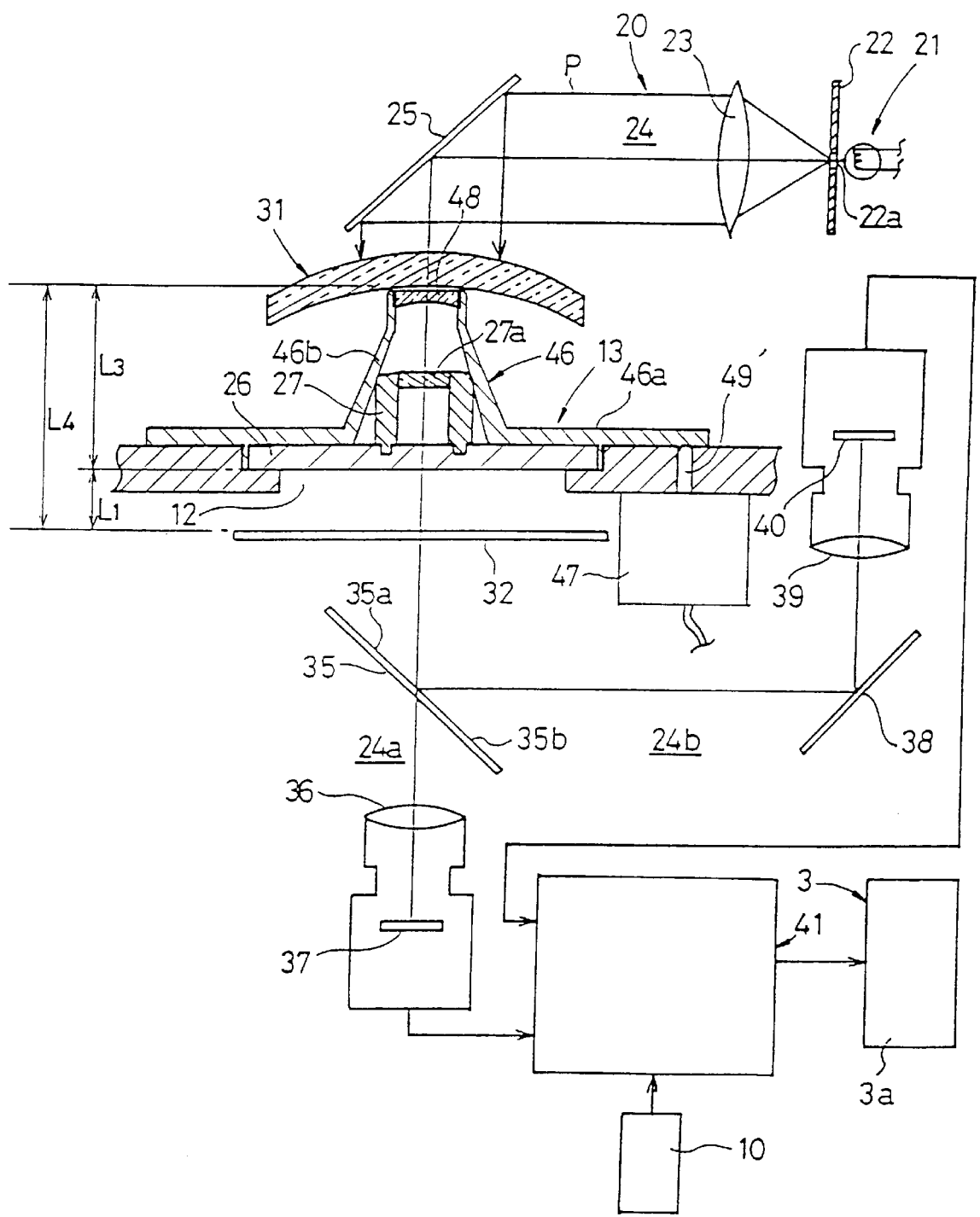
FIG. 15 is an optical diagram showing the fourth embodiment of the lens meter according to the present invention, an auxiliary lens receiving cylinder having been set on a lens receiver.

Hence, the height of the auxiliary lens receiving cylinder 46 from the support plate 26 is designed so as to be higher than that of the lens receiving cylinder 27 from the support plate 26. For example, as shown in FIG. 15, the height L3 from the support plate 26 to the top of the cylindrical lens receiving portion 46*b* is set to approximately 20 mm when the auxiliary lens receiving cylinder 46 is set on the lens receiving cylinder 27.

Thus, if the height L3 is set to approximately 20 mm when the auxiliary lens receiving cylinder 46 is set on the lens receiving cylinder 27, the lens characteristics of a desired narrow area on the eyeglass lens 31 could be measured without hindrance, because the edge 31a of the eyeglass lens 31 would not abut the support plate 26 or the lens receiving table 6, even if the eyeglass 31 were moved in the state of placement on the lens receiving cylinder 27, when measuring the desired narrow area of the eyeglass lens 31 in a normal measuring mode.

However, if the height of the auxiliary lens receiving cylinder 46 is merely increased from the support plate 26 or the lens receiving table to the cylindrical lens receiving portion 46b, the distance L4 from the top of the cylindrical lens receiving portion 46b to the screen 32 will be longer than a minimum of back focus distance f2 and therefore the eyeglass lens 31 with a minimum of back focus distance f2 will not be able to be measured. Hence, the auxiliary lens 48 with a minus degree (negative power) is employed, thereby making a correction so that the back focus distance is lengthened.

In the third embodiment of this invention, image pick-up devices comprise two in number and the auxiliary lens receiving cylinder 46 has been constituted by a transparent body. However, if a light shielding film is formed on the outer periphery of the seat portion 46a and cylindrical lens receiving portion 46b of the lens receiving cylinder 46 so that only the cylindrical lens receiving portion 46b of the lens receiving cylinder 46 transmits a measuring light beam and also the remaining portion does not transmit a measuring light beam, measurements can be taken in both the normal measuring mode and the wide-area measuring mode by a single image pick-up device as in the second embodiment of the present invention.

A processing circuit 41 will be automatically switched from the wide-area measuring mode to the normal measuring mode by a microswitch 47, if the auxiliary lens receiving cylinder 46 is placed on the lens receiving table 6.

In the first through the third embodiments, an eyeglass lens framed in the eyeglass frame can also be measured. FIG. 16 shows an example of the case where a framed eyeglass lens is measured, and the image pattern is rectangular in shape in correspondence with the configuration of the support plate 26.

Figure 16A:
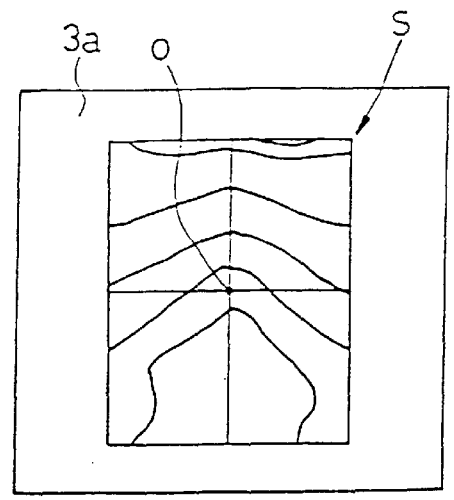
FIG. 16($a$) is a view showing an example of the mapping display of each lens characteristic value of an eyeglass lens, a spherical degree distribution being shown.
Figure 16B:
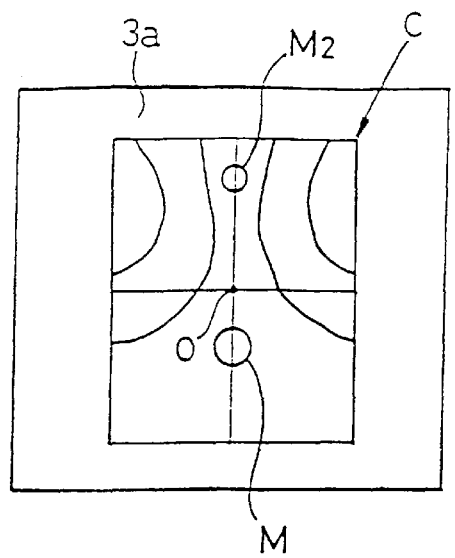
Figure 16C:
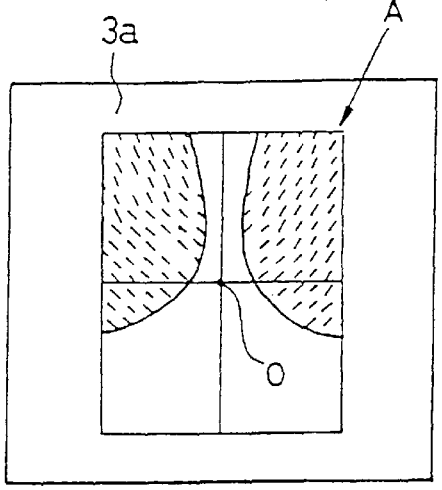
Figure 16D:
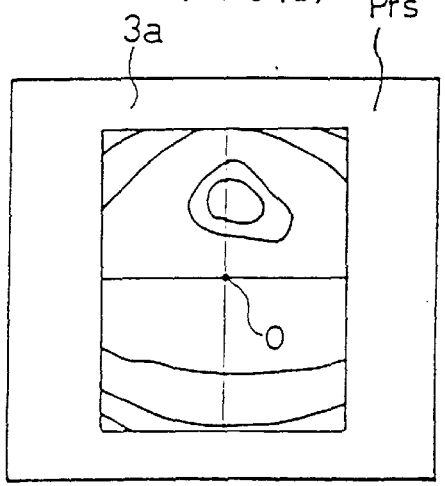

FIG. 16(a) shows a spherical degree S, FIG. 16(b) a cylindrical degree C, FIG. 16(c) an axial angle A, and FIG. 16(d) a prism degree Prs. In the figures, the range of measurement covers a range necessary as the eyeglass lens 31.

Figure 16E:
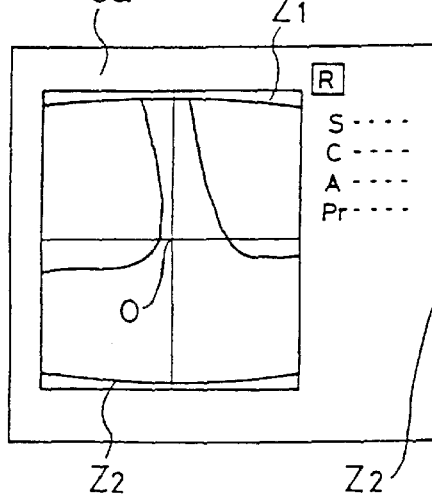
Figure 16F:
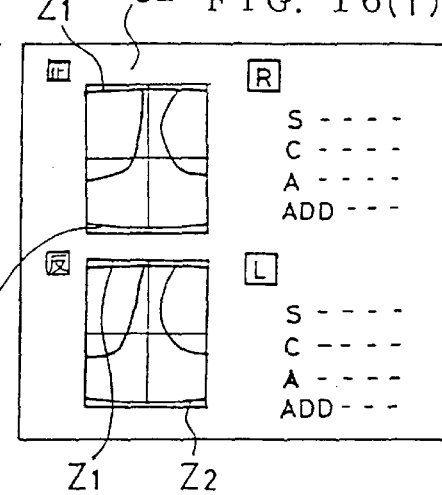
Figure 17:
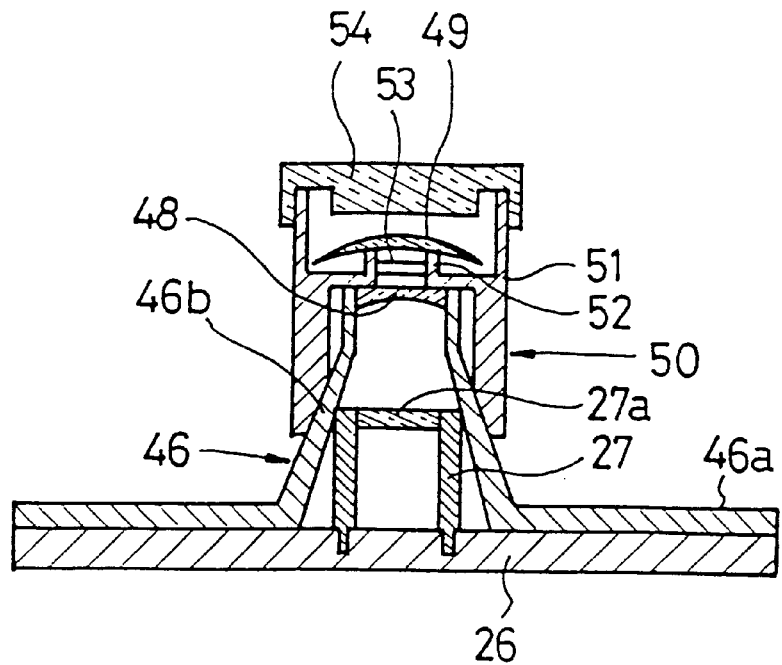
FIG. 17 is an explanatory diagram for explaining an embodiment which measures a contact lens, a lens container having been set on an auxiliary lens receiving cylinder.

Also, as shown in FIG. 16(e), the measured numerical values of the spherical degree S, cylindrical degree C, axial angle A, and prism degree Prs, for example, can also be displayed at the same time in parallel with the mapping display of the cylindrical degree C. Furthermore, as shown in FIG. 16(f), it is also possible to display the image of an eyeglass lens for a left eye (L) and the image of an eyeglass lens for a right eye (R) at the same time, and in addition, one image can be invertedly displayed in correspondence with the other image. If arranged in this way, it will be easy to know the layout of an eyeglass lens in the state where the eyeglass lens is framed in the eyeglass frame. Also, by superimposing and displaying one image inverted and the other image not inverted, the lens characteristics of an eyeglass lens for a left eye and an eyeglass lens for a right eye may also be compared with each other. Moreover, an eyeglass lens for a left eye and an eyeglass lens for a right eye may also be transversely arranged and displayed.

In FIGS. 16(e) and 16(f), reference characters Z1 and Z2 represent the images of the contour lines of an eyeglass lens framed in the eyeglass frame.

In this case, mapping display may also be performed as follows. As shown in FIG. 19(a), the center of measurement of a framed eyeglass lens is set at the far point portion M1 of the eyeglass lens, and a wide area on the eyeglass lens is measured. Then, the mapping display of the cylindrical degree C is performed by the lens characteristic values based on the measurement of the wide area at the far point portion M1 of the eyeglass lens. Next, while viewing this image, the position of the near point portion M2 of the eyeglass lens is identified. As shown in FIG. 19(b), the center of measurement of the framed eyeglass lens is moved to the near point portion M2, and a wide area on the framed eyeglass lens is measured at the near point portion M2 of the framed eyeglass lens. Finally, mapping display is performed by the lens characteristic values based on the measurement at the near point portion M2 of the framed eyeglass lens.

If done in this way, even in the case where the range of measurement of a wide area is narrow, that is, the display range of an image based on the measurement of the wide area is narrow, the measurements at the far point portion M1 and the near point portion M2 can be performed without hindrance.

Fourth Embodiment

Figure 18:
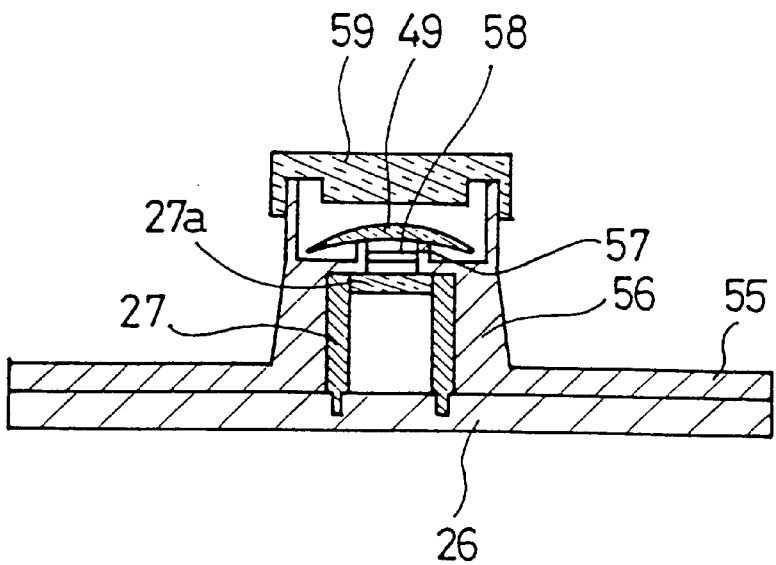
FIG. 18 is an explanatory diagram for explaining another embodiment which measures a contact lens, a lens container having been set directly on a lens receiving cylinder.

FIGS. 18 and 19 are diagrams used for explaining an embodiment which measures a contact lens 49. FIG. 18 shows the structure in which a lens container 50 is set to an auxiliary lens receiving cylinder 46. This lens container 50 comprises a main body 51, a contact lens setting portion 52, a cover glass 53 for sealing, and a cap plate 54. A physiological solution of sodium chloride is poured into the main body 51 of the lens container 50. In FIG. 19, the lens container 50 comprises a main body 56 with a seat portion 55, a contact lens setting portion 57, a cover glass 58 for sealing, and a cap plate 59, and the lens container 50 is placed on a support plate 26.

The first through the fourth embodiments have the advantages that the measured values of an eyeglass lens can be quickly displayed by measuring only a narrow area on the eyeglass lens and also mapping display can be performed by measuring a wide area on the eyeglass lens.

Fifth Embodiment

Figure 20:
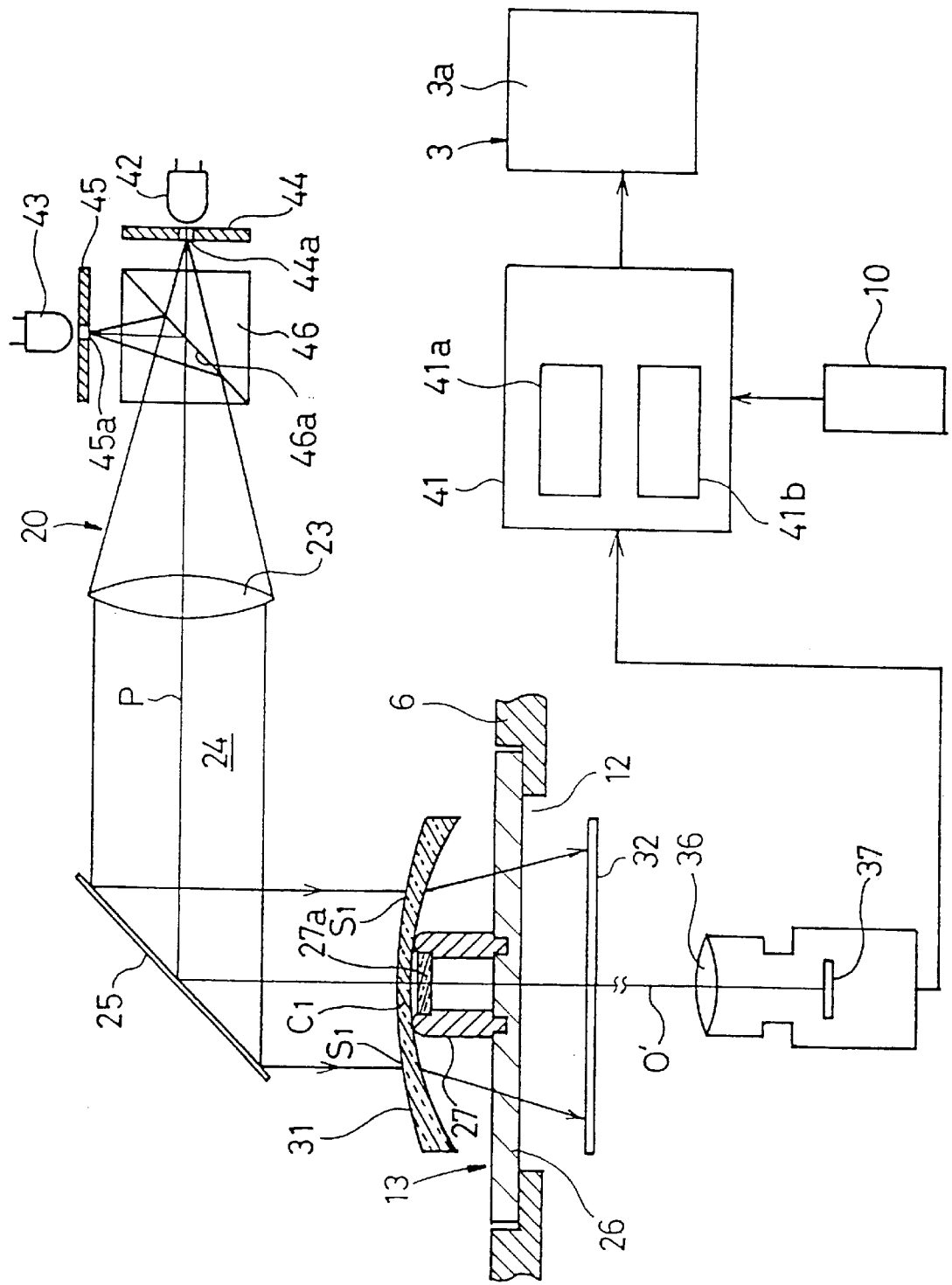
FIG. 20 is an optical diagram showing a fifth embodiment of the lens meter according to the present invention.
Figure 22:
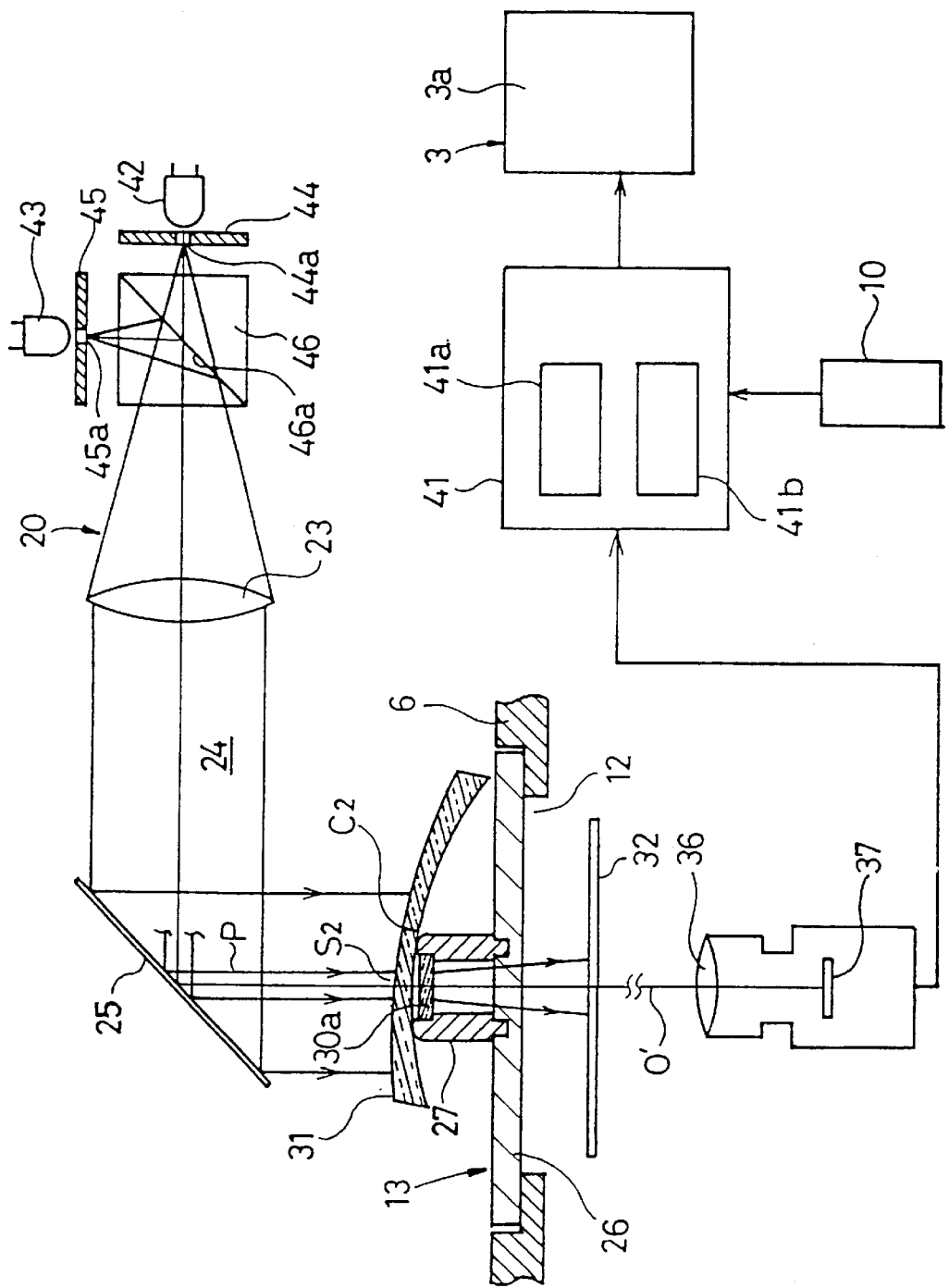
FIG. 22 is an optical diagram showing the fifth embodiment of the lens meter according to the present invention, measurements being performed in the state where a subject lens has been moved so that the periphery of the subject lens is positioned at the center of measurement of an optical path.

FIGS. 20 and 22 are each an optical diagram of a lens meter according to a fifth embodiment of the present invention. In the figures, the same reference numerals will be applied to the same parts as those shown in FIG. 9 and the detailed description is omitted for avoiding redundancy.

In the fifth embodiment, as with the second embodiment shown in FIG. 9, on an optical path 24 there is provided an image pick-up device 37 behind a screen 32 at a position which is conjugate with the screen 32 with respect to an image forming lens 36. The image pick-up device 37 is connected to a processing circuit 41. This processing circuit 41 has a function of performing both a narrow-area characteristic display mode which receives a central pattern image 33 based on a measuring light beam transmitted through a narrow area on an eyeglass lens 31 and also measures the narrow area alone and displays the measured values and a mapping display mode which receives a great number of peripheral pattern images 34 based on a measuring light beam transmitted through a wide area on the eyeglass lens 31 and also measures the wide area and performs mapping display. The processing circuit 41, as with the second embodiment, is connected to a change-over switch 10. The change-over switch 10 has a function of switching the processing circuit 41 between the narrow-area characteristic display mode which receives a central pattern image 33 based on a measuring light beam transmitted through a narrow area on the eyeglass lens 31 and also measures the narrow area alone and displays the measured values and the mapping display mode which receives a great number of peripheral pattern images 34 based on a measuring light beam transmitted through a wide area on the eyeglass lens 31 and also measures the wide area and performs mapping display.

If the change-over switch 10 is turned on, the processing circuit 41 will be caused to be in the narrow-area characteristic display mode and thereby an LED 42 will be driven. Then, the central pattern image 33 alone is projected on the screen 32. Next, only the central pattern image 33, based on the measuring light beam transmitted through the narrow area on the eyeglass lens 31, is received on the image pick-up device 37. Also, if the change-over switch 10 is turned off, the processing circuit 41 will be caused to be in the mapping display mode and thereby an LED 43 will be driven. Then, the peripheral pattern images 34 are projected onto the screen 32. Next, the peripheral pattern images 34, based on the measuring light beam transmitted through the wide area on the eyeglass lens 31, are received on the image pick-up device 37.

Initially, while the change-over switch 10 remains turned off, the eyeglass lens 31 is arranged in the optical path 24 so that the central portion C1 of the eyeglass lens 31 and the center O' of measurement of the optical path 24 are approximately aligned with each other, and a measuring light beam is projected onto the wide area S1 on the eyeglass lens 31. With this, the processing circuit 41 measures lens characteristics at each measuring point on the wide area S1 of the eyeglass lens 31. The processing circuit 41 has storage means 41a. The degree distribution at each measuring point on the wide area S1 is computed, and the lens characteristics are stored in the storage means 41a. Also, the spherical degree S, cylindrical degree C, axial angle A, and prism degree Prs are displayed on the display screen 3a of a display 3 with the center O of measurement on the screen as a reference.

Figure 21B:
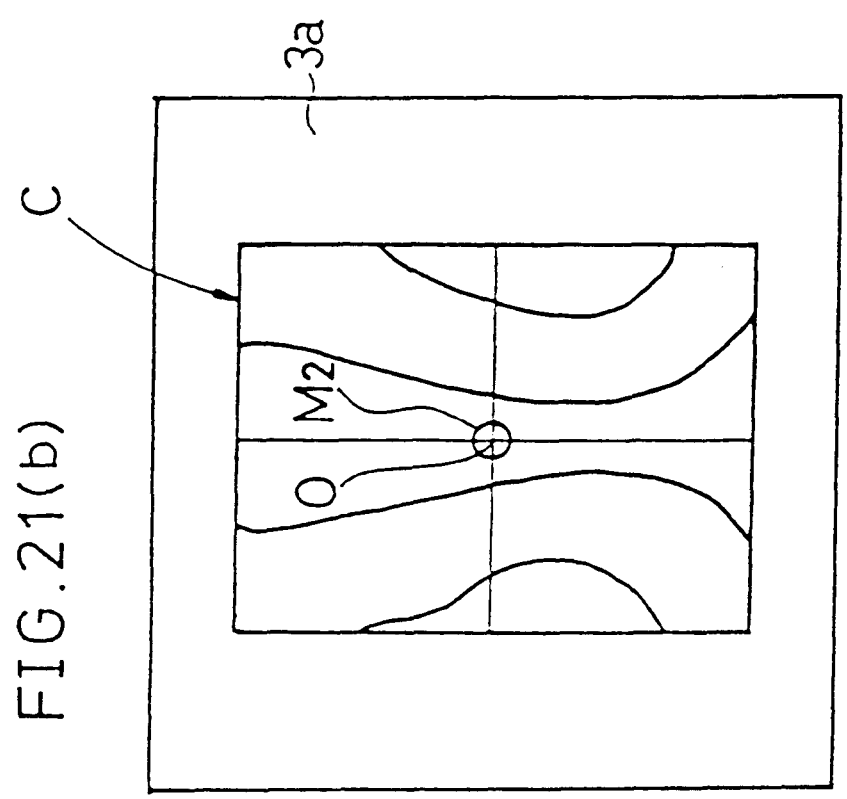
FIG. 21(b) is a view showing an example of the image displayed by the lens meter according to a fifth embodiment, the image having been moved based on a prism quantity obtained by performing measurement in the state where the peripheral portion of the eyeglass lens is aligned with the center of measurement of an optical path.
Figure 21A:
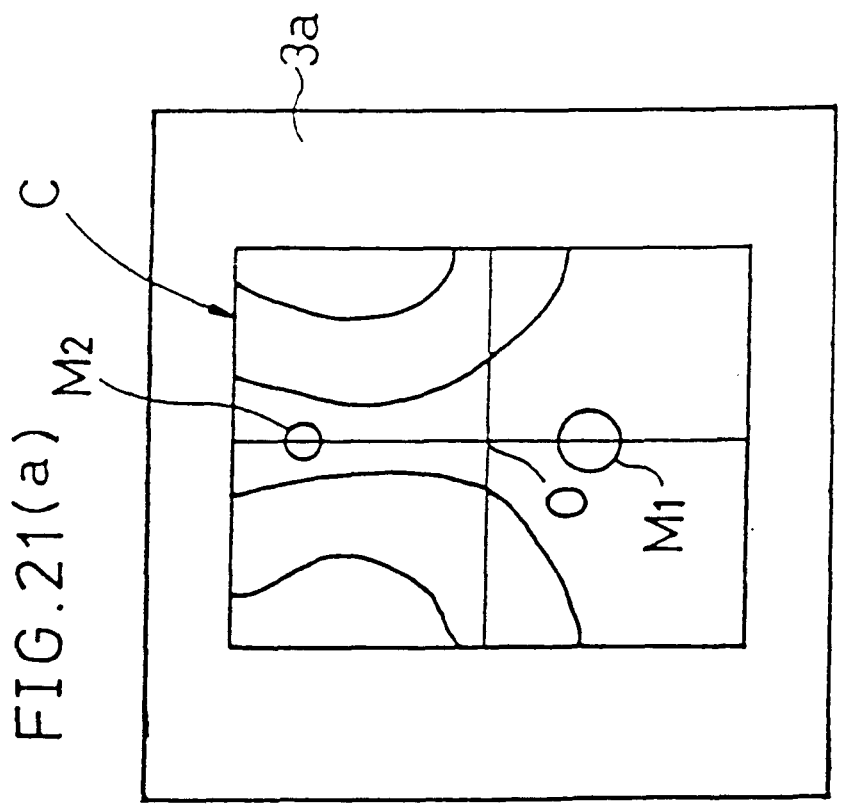
FIG. 21(a) is a view showing an example of the image displayed by the lens meter according to the fifth embodiment, and the cylindrical degree, obtained by measuring the lens characteristics at each measuring point on the wide area of the eyeglass lens in the state where the central portion of the eyeglass lens and the center of measurement of an optical path are aligned with each other, having been mapped.

In FIG. 21(a) there is shown an example of the state where the cylindrical degree C has been displayed on the screen 3a. The processing circuit 41 functions as imaging/displaying means for imaging the lens characteristic information about a spherical degree S, a cylindrical degree C, an axial angle A, and about prism degree Prs, based on the lens characteristics at each measuring point on the wide area S1 of the eyeglass lens 31, and also performing mapping display with the center O of measurement on the screen as a reference.

In this embodiment, the image pattern is rectangular in shape in correspondence with the configuration of the support plate 26. Since the entire eyeglass lens 31 is not measured, the image pattern is in a range which can cover an area necessary as the eyeglass lens 31. Therefore, the speed of measuring the lens characteristics is accelerated.

Next, the change-over switch 10 is turned on, and as shown in FIGS. 21(a) and 21(b), the eyeglass lens 31 is moved in the state of placement on the lens receiver 13 so that the near point portion M2 as the periphery of the eyeglass lens 31 is positioned at the center O' of measurement of the optical path 24. At this position, a desired narrow measuring point S2 (FIG. 22) on the eyeglass lens 31 is measured.

The processing circuit 41 is equipped with arithmetic means 41 which computes the direction of movement and the quantity of movement of the eyeglass lens 31, based on only the narrow measuring point S2 of the eyeglass lens 31.

The arithmetic means 41 in this embodiment computes a quantity of movement, based on a prism quantity Prs. In the computation of this prism quantity the following Prentice's rule is employed.

$$X = 10 \cdot Prs/S$$

where X is the offset quantity of the eyeglass lens 31 from the geometric center C2 (see FIG. 22), Prs is the prism quantity, and S is the lens degree.

Since the prism quantity Prs at each measuring point on the wide area S1 has been obtained with the first measurement, the quantity of movement of the eyeglass lens 31 will be obtained if the current prism quantity at the narrow measuring point S2 is compared with the previous prism quantity. In addition, based on the direction of movement of the central pattern image 33, the direction of movement of the eyeglass lens 31 is obtained.

The aforementioned computation can be processed at high speed, because it is based on the measurement of the narrow area alone.

Based on the result of the computation of the arithmetic means 41b, the processing circuit 41 moves the image obtained based on the lens characteristics of each measurement stored in the storage means 41a so that the measuring point S2 on the eyeglass lens 31 is aligned on the screen with the center O' of measurement of the optical path 24 when the eyeglass lens 31 is moved.

As a result, as shown in FIG. 21(b), an image where the center O of measurement on the screen and the measuring point S2 are aligned with each other is displayed in real time, while being moved as the eyeglass lens 31 is moved.

Since the lens meter according to the fifth embodiment has been constructed as described above, it has the advantage that the measuring point on a subject lens and the center of measurement of an optical path can be aligned on the screen and displayed at high speed in real time in correspondence with movement of the subject lens.

Figure 23:
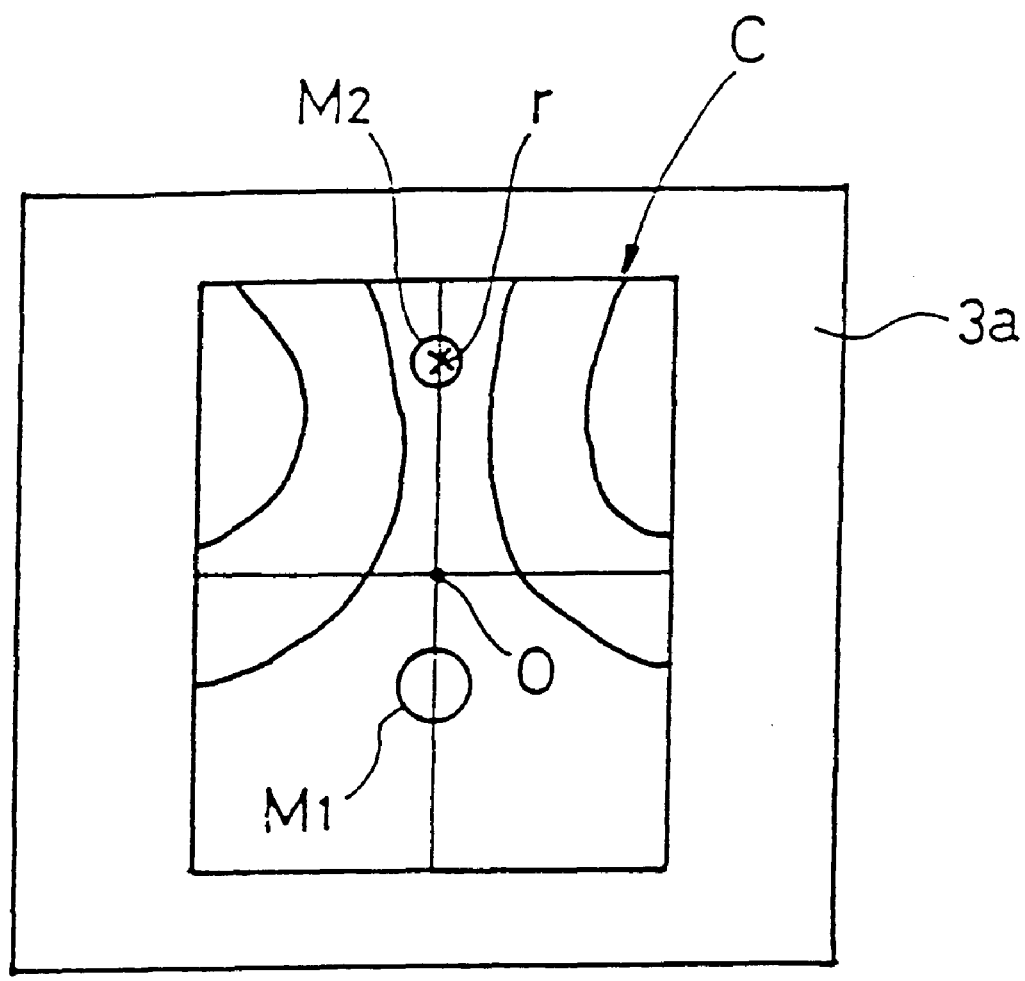
FIG. 23 is a view showing an image display modification.

FIG. 23 shows a modification of the fifth embodiment of the present invention. In this modification, while an image obtained at the position of the eyeglass lens 31 of FIG. 1 remains fixed, a desired measuring point (r) is displayed on the screen, based on the arithmetic means 41b, in correspondence with movement of the eyeglass lens 31. The processing circuit 41 functions imaging/displaying means for displaying a desired measuring point (r) on the screen, based on the arithmetic means 41b, in correspondence with movement of the eyeglass lens 31.

Figure 24:
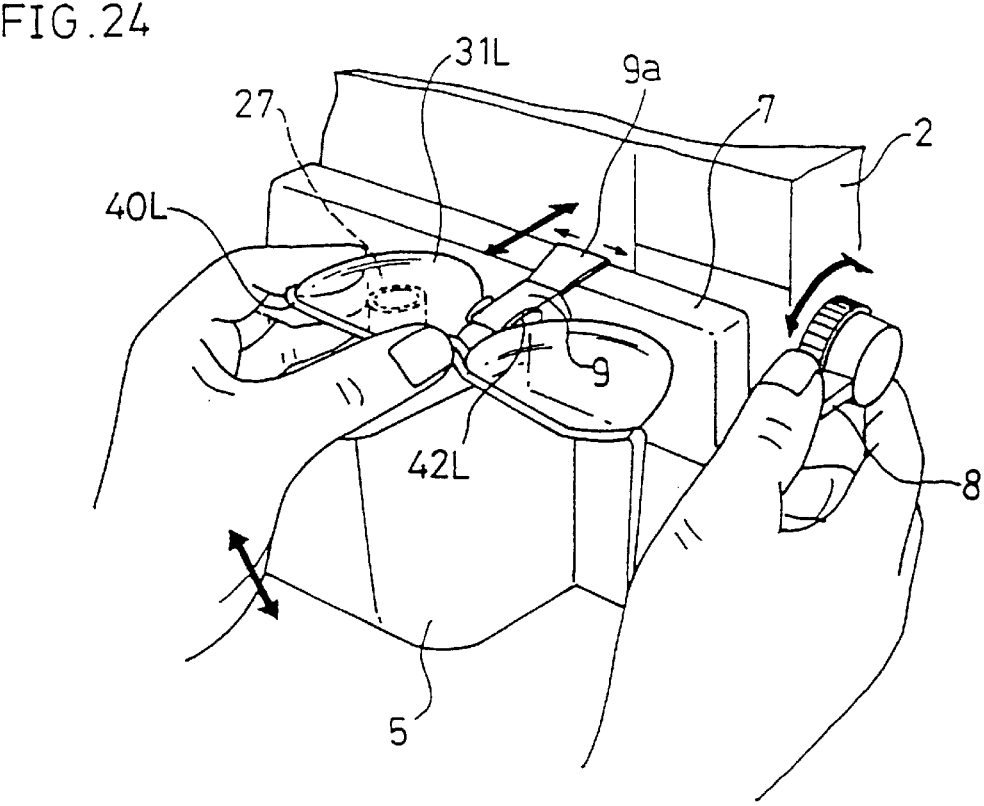
FIG. 24 is a part-enlarged view showing how a framed eyeglass lens is set on the lens receiver.
Figure 25:
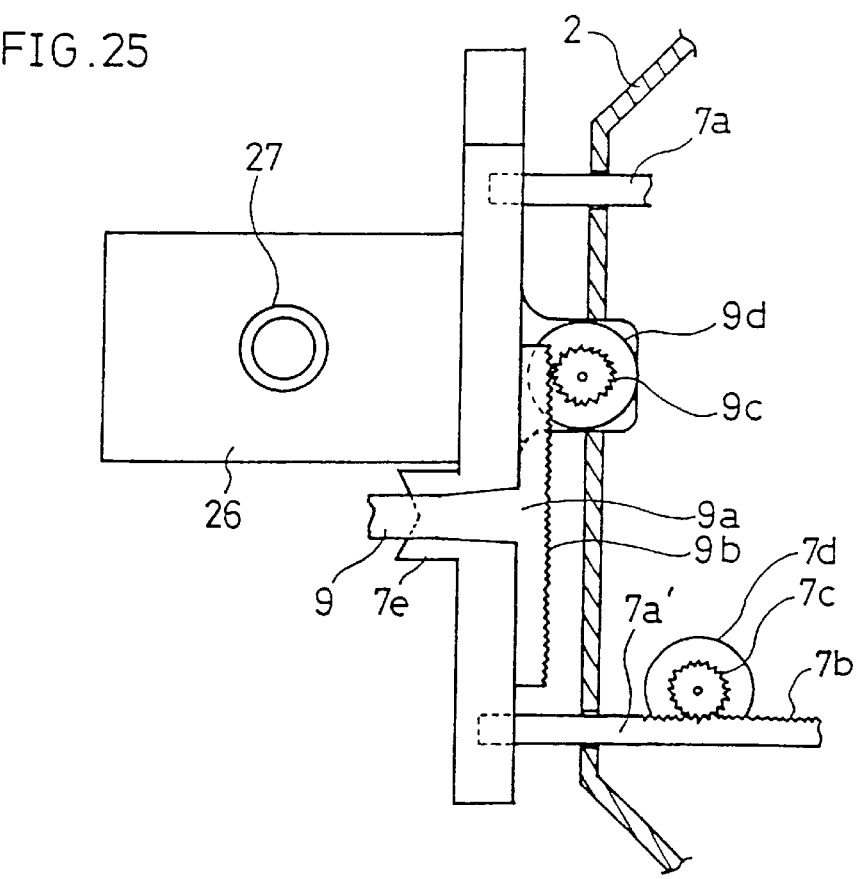
FIG. 25 is a top view showing how the X and Y positions of a framed eyeglass lens are detected.
Figure 26A:
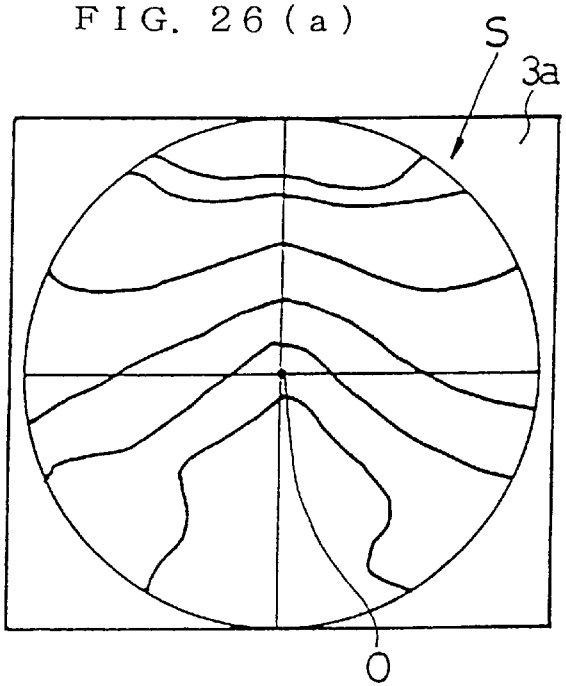
FIG. 26(a) is a view showing an example of the mapping display of each lens characteristic value of an eyeglass lens performed by a conventional lens meter, a spherical degree distribution being shown.
Figure 26B:
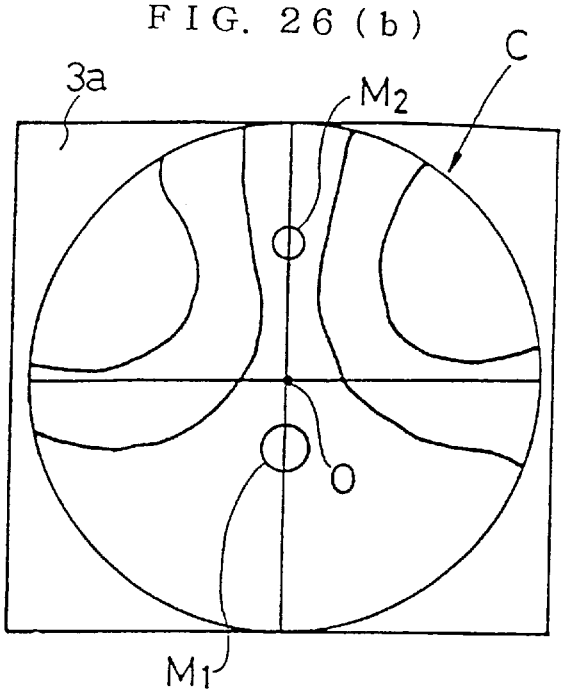
FIG. 26(b) is a view similar to FIG. 26(a) showing a cylindrical degree distribution.
Figure 26C:
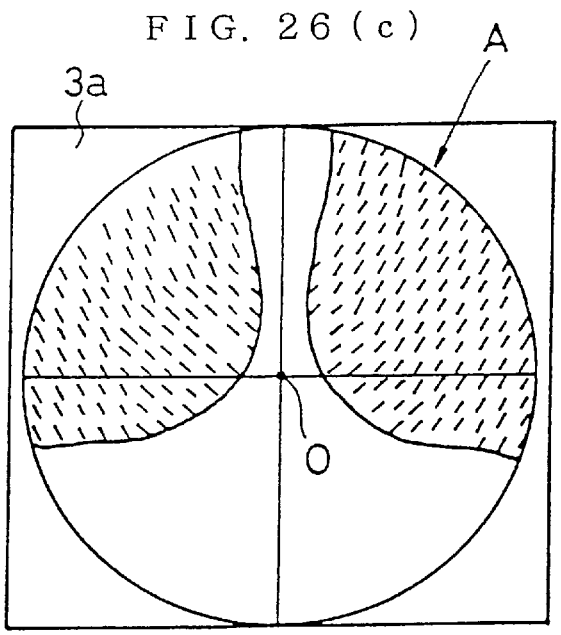
FIG. 26(c) is a view similar to FIG. 26(a) showing an axial angle distribution.
Figure 26D:
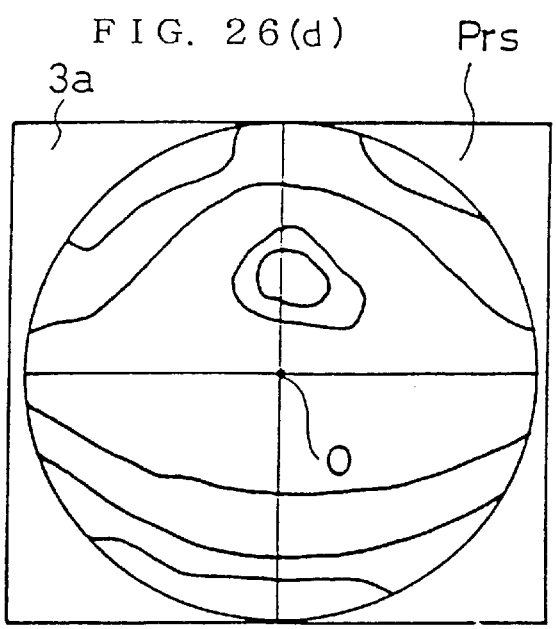
FIG. 26(d) is a view similar to FIG. 16(a) showing a prism degree distribution.

FIGS. 24 and 25 show other modifications of the fifth embodiment of the present invention. In order to set an eyeglass lens 31L framed in a frame 40L on a lens receiving cylinder 27, the nose pad 42L of the frame 40L is placed on a nose-pad support member 9 and then the nose-pad support member 9 is moved right and left and also moved downward by a slider 9 so that the eyeglass lens 31 is supported by the lens receiving cylinder 27.

A lens pad 7, as shown in FIG. 25, is guided back and forth along guide rods 7a and 7a'. The rear end portion of the guide rod 7a' is provided with a rack 7b, which is engaged by a pinion 7c. The pinion 7c constitutes a portion of a potentiometer 7d. The potentiometer 7d detects the position of the lens pad 7 in the back-and-forth direction of the pad and outputs a pulse signal. The rear end portion of the slider 9a is provided with a rack 9b, which is engaged by a pinion 9c. This pinion 9c constitutes a portion of a potentiometer 9d, which is supported by the lens pad 7. The potentiometer 9d detects the position of the nose-pad support member 9 in the right-and-left direction of the member 9 and outputs a pulse signal. In this way, the coordinate positions of the eyeglass lens 31 in X and Y directions can be detected.

The aforementioned potentiometers 7d and 9d function as movement-quantity measurement means which measures a quantity of movement when the eyeglass lens 41 as a subject lens is moved with respect to a measuring light beam so that the periphery of the eyeglass lens 41 is positioned at the enter O' of measurement of the optical path 24. The image, obtained based on the lens characteristics at each measuring point stored in the storage means 41a, is displayed so that the measuring point on the subject lens and the center O' of measurement of the optical path are aligned on the screen when the subject lens is moved with respect to the measuring light beam, by performing a coordinate conversion based on the result of the measurement of the movement-quantity measurement means.

In the case where an unprocessed eyeglass lens 31 is measured by the aforementioned movement-quantity measurement means, it will be sufficient if the eyeglass lens 31 is positioned by lifting the nose-pad support member 9 and bringing the edge of the unprocessed eyeglass lens 31 into contact with an edge-pad member 7e positioned under the nose-pad support member 9.

In addition, in the fifth embodiment, while the direction of movement and the quantity of movement of the eyeglass lens 31 or 31L have been obtained based on the prism quantity, they may also be obtained based on a spherical degree S, a cylindrical degree C, and an axial angle A.

Furthermore, in this lens meter, the lens characteristics of a contact lens can also be measured if a lens holder for contact lens is set on the lens receiver 13.

While the present invention has been described with reference to preferred embodiments thereof, the invention is not to be limited to the details given herein, but may be modified within the scope of the appended claims.

What is claimed is:

1. A lens meter comprising:

a light source for generation of a measuring light beam;

a normal measuring mode for obtaining and displaying lens characteristic values by measuring a narrow area of an eyeglass lens, the narrow area of said eyeglass lens alone being measured and resultant values being displayed based on an image of a central pattern formed by a first transmitted measuring light beam passed through the narrow area of said eyeglass lens;

a wide-area measuring mode for measuring a wide area of said eyeglass lens and thereafter performing mapping display based on a second transmitted measuring light beam which has passed through the wide area of said eyeglass lens;

means for switching the order of said normal measuring mode and said wide area measuring mode;

a lens receiver for setting the eyeglass lens, said lens receiver being provided in an optical path of the measuring light beam and having a support plate and a lens receiving cylinder, the support plate including the central pattern for measuring the narrow area of the eyeglass lens, and a plurality of peripheral patterns for measuring the wide area of the eyeglass lens, the central pattern being formed inside the lens receiving cylinder, the peripheral patterns being formed outside the lens receiving cylinder; and a processing circuit for computing a degree distribution based on the lens characteristics at each position on the wide area by a great number of images of the peripheral patterns.

2. The lens meter as set forth in claim 1, wherein:

said light source has a wavelength distribution characteristic and a plurality of wavelength characteristics;

an image receiving optical path for receiving the pattern images formed by the transmitted measuring light beams is divided into a first image receiving path for receiving the image of said central pattern and a second image receiving path for receiving the images of said peripheral patterns formed by the transmitted measuring light beam; and including a beam splitter located at a position at which said image receiving optical path is divided into the first and second image receiving paths, said beam splitter transmitting a portion of the transmitted measuring light beams and reflecting the remaining portion.

3. The lens meter as set forth in claim 2 including an optical magnifying system for magnifying the image of said central pattern in said first image receiving path.

4. The lens meter as set forth in claim 1, wherein:

said light source is equipped with first and second light sources which generate measuring light beams different in wavelength from each other, said first light source being employed in the normal mode and said second light source being employed in the wide-area measuring mode;

said central pattern has an optical wavelength characteristic which transmits at least the measuring light beam emitted from said first light source; and said peripheral patterns have an optical wavelength characteristic which transmits only the measuring light beam emitted from said second light source.

5. The lens meter as set forth in claim 1, wherein an auxiliary lens receiving cylinder is set on said lens receiving cylinder in the normal measuring mode, said auxiliary lens receiving cylinder comprising a lens receiving cylinder portion which transmits the transmitted measuring light beam contributing to formation of the image of said central pattern and a seat portion which shuts out the transmitted measuring light beam contributing to formation of the images of said peripheral patterns.

6. The lens meter as set forth in claim 5, wherein an auxiliary lens with a minus degree is provided in said auxiliary lens receiving cylinder.

7. The lens meter as set forth in claim 5, wherein a height of said auxiliary lens receiving cylinder from said support plate is greater than that of said lens receiving cylinder of said lens receiver from said support plate.

8. The lens meter as set forth in claim 5, wherein either said auxiliary lens receiving cylinder or said lens receiver is equipped with change-over means for automatically switching a mode from the wide-area measuring mode to the normal measuring mode when the auxiliary lens receiving cylinder is set on said lens receiver.

9. The lens meter as set forth in claim 1, wherein a pattern shape of said central pattern and pattern shapes of said peripheral patterns are different from each other.

* * * * *